United States Patent

Kajita et al.

Patent Number: 5,161,187
Date of Patent: Nov. 3, 1992

[54] CABLE TELEVISION SYSTEM

[75] Inventors: Harumasa Kajita, Fujisawa; Toyokazu Yanagimichi, Chigasaki; Tetsuo Kariya; Toshikazu Wakabayashi, both of Fujisawa; Ichiro Kawashima, Chigasaki; Satoshi Nakanami, Kamakura; Masami Tanaka, Yokohama, all of Japan

[73] Assignee: Matsushita Electric Industrial Co., Ltd., Osaka, Japan

[21] Appl. No.: 665,949

[22] Filed: Mar. 7, 1991

[30] Foreign Application Priority Data

Mar. 12, 1990 [JP] Japan .................. 2-60239

[51] Int. Cl.⁵ .................................... H04N 7/167
[52] U.S. Cl. .................................... 380/15; 380/20; 380/21
[58] Field of Search .................. 380/11, 12, 15, 20, 380/21

[56] References Cited

U.S. PATENT DOCUMENTS

| | | | |
|---|---|---|---|
| 4,466,017 | 8/1984 | Banker | 380/15 |
| 4,511,919 | 4/1985 | Forgey et al. | 380/15 |
| 4,590,519 | 5/1986 | Zelenz | 380/15 |
| 4,703,354 | 10/1987 | Auld, Jr. et al. | 380/15 X |
| 4,748,667 | 5/1988 | Farmer et al. | 380/15 X |
| 4,924,498 | 5/1990 | Farmer et al. | 380/15 |
| 5,063,594 | 11/1991 | Uehara | 380/15 |

FOREIGN PATENT DOCUMENTS

| | | |
|---|---|---|
| 49-24530 | 3/1974 | Japan . |
| 50-12911 | 2/1975 | Japan . |
| 56-106476 | 8/1981 | Japan . |
| 57-121385 | 7/1982 | Japan . |

Primary Examiner—Tod Swann
Attorney, Agent, or Firm—Lowe, Price, LeBlanc & Becker

[57] ABSTRACT

A cable television system includes a transmitter and at least one receiver. In the transmitter, sync information is suppressed in amplitude to execute scrambling, and a sync width information signal and key data are superimposed on a television signal during a vertical blanking period. The sync width information signal has a burst form and a predetermined width, and represents whether sync information is present or absent. The key data represents contents of the scrambling. In the receiver, the sync width information signal is recovered, and a sync width information pulse corresponding to the sync width information signal is generated. A reference signal is generated on the basis of an edge of the sync width information pulse. The key data is extracted from the scrambled video information in response to the reference signal. Pseudo sync signals are generated in response to an edge of the sync width information pulse. The sync information of the scrambled video information is increased in amplitude in response to the extracted key data at timings determined by the pseudo sync signals.

15 Claims, 12 Drawing Sheets

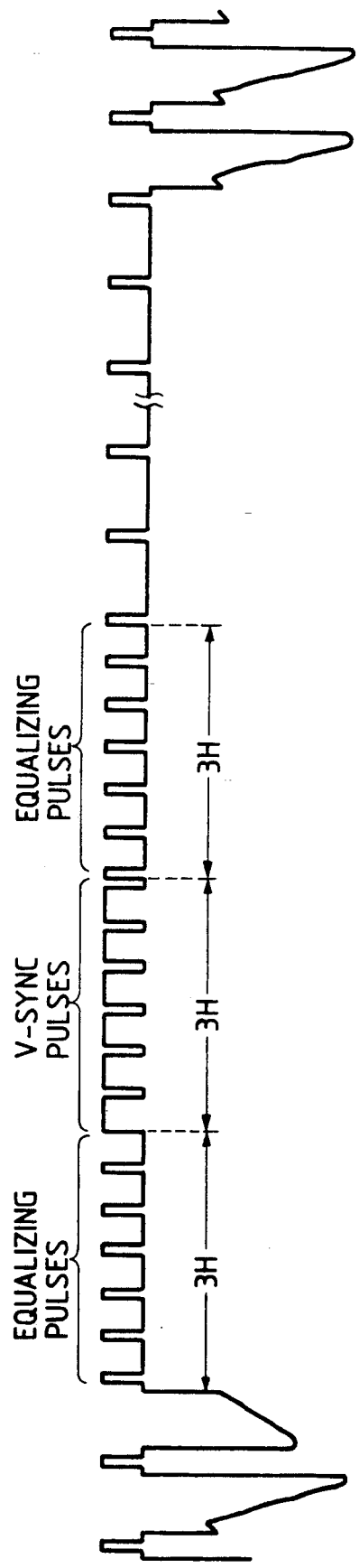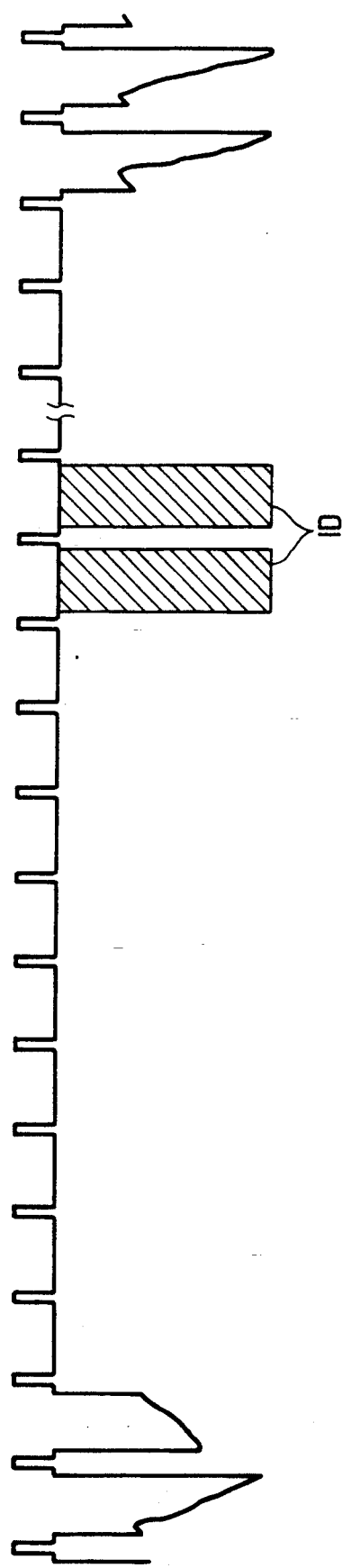

CABLE TELEVISION SYSTEM

BACKGROUND OF THE INVENTION

This invention relates to a cable television system including a scrambler and a de-scrambler.

In some subscription cable television systems, a television signal is scrambled for secrecy by a scrambler in a transmitting station before being fed to individual receivers of subscribers, and the receivers have de-scramblers for restoring the original television signal.

As will be explained later, prior art cable television systems of such a type and prior art television signal scrambling techniques and systems have some problems.

SUMMARY OF THE INVENTION

It is an object of this invention to provide an improved cable television system.

A first aspect of this invention provides a cable television system comprising a transmitter for transmitting scrambled video information, and at least one receiver receiving the scrambled video information from the transmitter, wherein the transmitter comprises means for suppressing vertical and horizontal sync information in amplitude to execute selectively scrambling; and means for superimposing a sync width information signal and key data on a television signal during a predetermined video period within a vertical blanking period, the sync width information signal being modulated at a video band frequency and having a burst form and a predetermined width, the sync width information signal representing whether sync information is present or absent, the key data having a plurality of bits and representing contents of said scrambling; wherein the receiver comprises pulse reproducing means for recovering the sync width information signal and outputting a sync width information pulse corresponding to the sync width information signal; means for generating a reference signal on the basis of an edge of the sync width information pulse outputted from the pulse reproducing means; means for extracting the key data from the scrambled video information in response to the reference signal; means for generating pseudo vertical and horizontal sync signals in response to an edge of the sync width information pulse outputted from the pulse reproducing means; and means for increasing the vertical and horizontal sync information of the scrambled video information in amplitude in response to the extracted key data at timings determined by the pseudo vertical and horizontal sync signals.

A second aspect of this invention provides a cable television system comprising a transmitter for transmitting scrambled video information, and at least one receiver receiving the scrambled video information from the transmitter, wherein the transmitter comprises means for suppressing vertical and horizontal sync information in amplitude to execute selectively scrambling; means for superimposing a sync width information signal, a sync pattern signal, and key data on a television signal during a predetermined video period within a vertical blanking period, the sync width information signal being modulated at a video band frequency and having a burst form and a predetermined width, the sync width information signal representing whether sync information is present or absent, the sync pattern signal following the sync width information signal by a predetermined time and having a plurality of bits including a marker signal, the key data having a plurality of bits and representing contents of said scrambling; wherein the receiver comprises pulse reproducing means for recovering the sync width information signal and outputting a sync width information pulse corresponding to the sync width information signal; means for generating a reference signal on the basis of an edge of the sync width information pulse outputted from the pulse reproducing means; means for extracting the sync pattern signal and the key data from the scrambled video information in response to the reference signal; means for generating pseudo vertical and horizontal sync signals in response to the marker signal included in the sync pattern signal; deciding means for deciding whether or not the extracted sync pattern signal agrees with a predetermined pattern signal, and outputting an agreement detection signal when the extracted sync pattern signal agrees with the predetermined pattern signal; and means for increasing the vertical and horizontal sync information of the scrambled video information in amplitude in response to the extracted key data and the agreement detection signal at timings determined by the pseudo vertical and horizontal sync signals.

A third aspect of this invention provides a cable television system comprising a transmitter for transmitting scrambled video information, and at least one receiver receiving the scrambled video information from the transmitter, wherein the transmitter comprises means for suppressing vertical and horizontal sync information in amplitude to execute selectively scrambling which is changeable among a plurality of different modes; means for superimposing a sync width information signal, a sync pattern signal, and key data on a television signal during a vertical blanking period, the sync pattern signal having a plurality of bits including a marker signal; and means for transmitting control data to the receiver, the control data being designed so as to determine a mode of the scrambling when being combined with the key data; wherein the receiver receives the control data from the transmitter and comprises pulse reproducing means for recovering the sync width information signal and outputting a sync width information pulse corresponding to the sync width information signal; means for generating a reference signal on the basis of an edge of the sync width information pulse outputted from the pulse reproducing means; means for extracting the key data from the scrambled video information in response to the reference signal; calculating means for combining the extracted key data and the received control data, and deciding a mode of the scrambling in response to a result of combining the extracted key data and the received control data; and means for increasing the vertical and horizontal sync information of the scrambled video information in amplitude in response to the scrambling mode decided by the calculating means.

A fourth aspect of this invention provides a transmitter of a cable television system, comprising means for suppressing vertical and horizontal sync information in amplitude in a predetermined pattern to execute selectively scrambling; and means for superimposing a sync width information signal, a sync pattern signal, and key data on a television signal during a predetermined video period within a vertical blanking period, the sync width information signal being modulated at a video band frequency and having a burst form and a predetermined width, the sync width information signal representing whether sync information is present or absent, the sync pattern signal following the sync width information signal by a predetermined time and having a plurality of bits including a marker signal, the key data following the sync pattern signal by a predetermined time and having a plurality of bits, the key data representing contents of said scrambling.

A fifth aspect of this invention provides a receiver of a cable television system, comprising pulse reproducing means for recovering a sync width information signal which is superimposed on a scrambled television signal during a vertical blanking period, and for outputting a sync width information pulse corresponding to the sync width information signal; means for generating a reference signal on the basis of an edge of the sync width information pulse outputted from the pulse reproducing means; means for extracting key data from the scrambled television signal in response to the reference signal, the key data being superimposed on the scrambled television signal during the vertical blanking period and following the sync width information signal; means for generating pseudo vertical and horizontal sync signals in response to an edge of the sync width information pulse outputted from the pulse reproducing means; and means for increasing vertical and horizontal sync information of the scrambled television signal in amplitude to de-scramble the scrambled television signal in response to the extracted key data at timings determined by the pseudo vertical and horizontal sync signals.

A sixth aspect of this invention provides an apparatus for a cable television receiver, comprising means for generating pseudo sync information; means for increasing sync information in scrambled video information in amplitude in response to the pseudo sync information to de-scramble the scrambled video information into a de-scrambled video information; means for separating actual sync information from the de-scrambled video information; and means for controlling the pseudo sync information in response to the separated actual sync information to nullify a phase difference between the pseudo sync information and the actual sync information.

A seventh aspect of this invention provides a cable television system comprising a transmitter for transmitting scrambled video information, and at least one receiver receiving the scrambled video information from the transmitter, wherein the transmitter comprises means for suppressing vertical and horizontal sync information in amplitude to execute selectively scrambling to convert a television signal into a scrambled television signal; means for superimposing a sync width information signal, a sync pattern signal, and key data on the scrambled television signal during a predetermined period within a vertical blanking period, the sync width information signal being modulated at a video band frequency and having a burst form, the sync width information signal representing whether sync information is present or absent, the sync pattern signal having a plurality of bits and representing a timing of the sync information, the key data having a plurality of bits and representing contents of said scrambling; and means for transmitting control data to the receiver independently of a transmission of the scrambled video information, the control data being designed so as to determine a mode of the scrambling when being combined with the key data; wherein the receiver comprises means for de-scramble the scrambled video information in accordance with the mode determined by a combination of the key data and the control data only when the sync pattern signal agrees with a predetermined pattern signal and the key data and the control data are detected.

An eighth aspect of this invention provides a television network system comprising a transmitter for generating a scrambled television signal, a receiver, and means connecting the transmitter and the receiver for transmitting the scrambled television signal from the transmitter to the receiver, wherein the transmitter comprises means for suppressing a sync component of a television signal relative to a non-sync component of the television signal by a changeable suppression level; means for changing the suppression level currently used by the suppressing means; means for generating coded information representing the suppression level currently used by the suppressing means; means for generating a reference signal having a predetermined timing relation with the sync component of the television signal; and means for adding the coded information and the reference signal into the television signal; whereby the television signal is converted into a corresponding scrambled television signal; wherein the receiver comprises means for extracting the coded information from the scrambled television signal; means for detecting the suppression level represented by the extracted coded information; means for extracting the reference signal from the scrambled television signal; and means for increasing a sync component of the scrambled television signal relative to a non-sync component of the scrambled television signal in response to the extracted reference signal by an increase level dependent on the detected suppression level.

BRIEF DESCRIPTION OF THE DRAWINGS

FIG. 2 is a time-domain diagram showing the waveform of a standard-format television signal in the prior art system of FIG. 1.

FIG. 3 is a time-domain diagram showing the waveform of a scrambled television signal in the prior art system of FIG. 1.

DESCRIPTION OF THE PRIOR ART

Japanese published unexamined patent application 57-121385 discloses a television signal scrambling technique of a sync suppression type in a cable television system. According to the scrambling technique of Japanese application 57-121385, the amplitudes of vertical and horizontal sync pulses in a radio-frequency video-information carrier are suppressed so that a good synchronization will not be obtained in a normal reproducing and display device, and key data for de-scrambling are derived from a signal which is added to a radio-frequency audio-information carrier by amplitude modulation.

Japanese published unexamined patent application 56-106476 discloses a satellite television broadcasting system using a television signal scrambling technique of a sync suppression type. The satellite television broadcasting system of Japanese application 56-106476 will be described in detail hereinafter.

Figure 1:
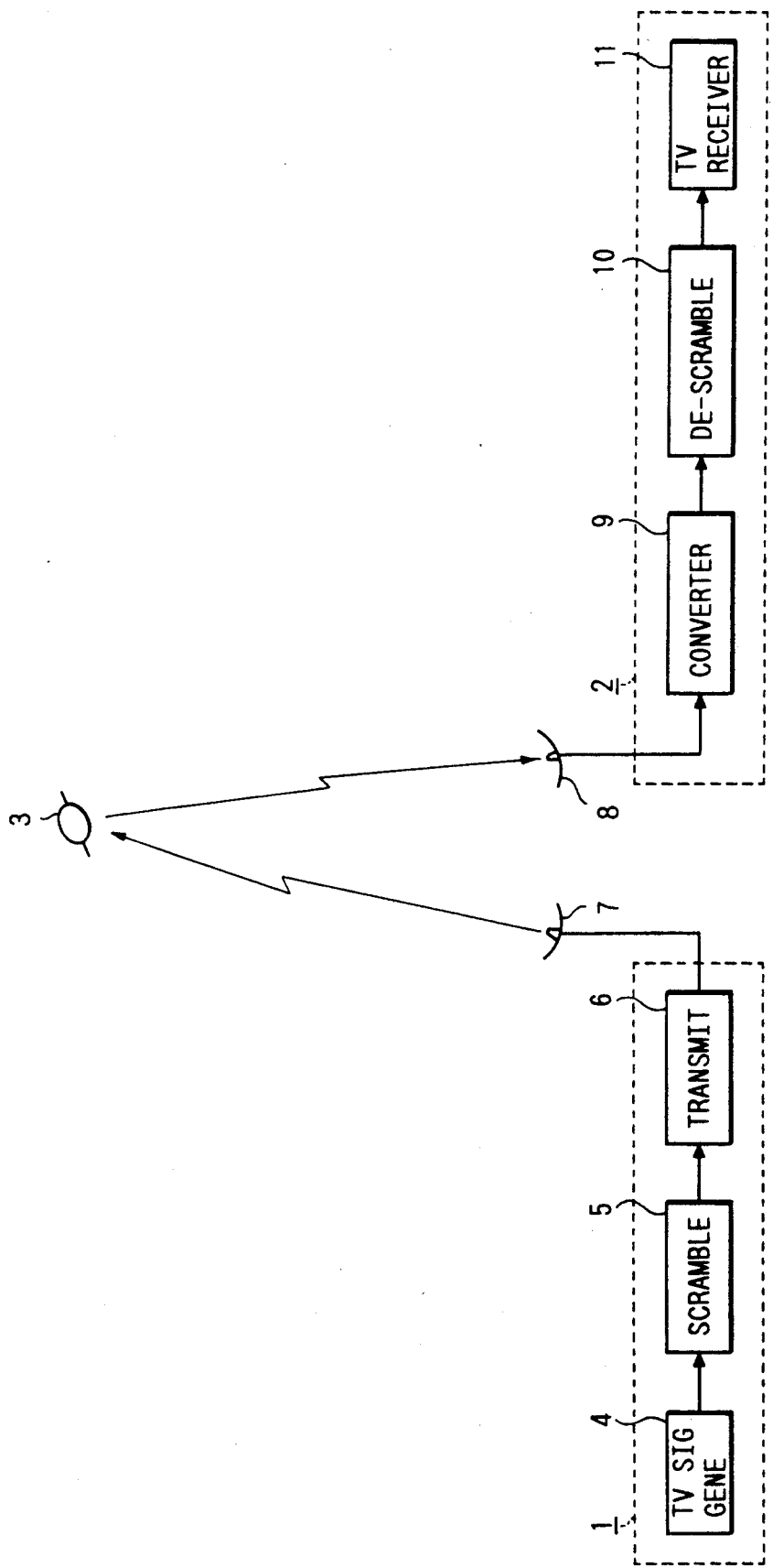
FIG. 1 is a block diagram of a prior art satellite television broadcasting system.

As shown in FIG. 1, the prior art satellite television broadcasting system includes a transmitting ground station 1, a receiving ground station 2, and a communication satellite 3. A radio-frequency (RF) television signal is transmitted from the transmitting station 1 to the communication satellite 3, and then the television signal is transmitted from the communication satellite 3 to the receiving station 2.

The transmitting station 1 includes a television signal generator 4, a scrambling circuit 5, and a transmitter 6. The television signal generator 4 generates a television signal of a standard format. Then, the television signal is converted by the scrambling circuit 5 into a corresponding television signal of a special format, that is, a corresponding scrambled television signal. The transmitter 6 generates an SHF-band television signal from the scrambled television signal through a suitable process such as a frequency modulation process using a carrier signal, and transmits the SHF-band television signal to the communication satellite 3 via an antenna 7.

The communication satellite 3 receives the SHF-band television signal, retransmitting the SHF-band television signal toward the ground after converting the frequency of the received television signal and amplifying the received television signal if necessary.

The receiving station 2 includes a converter 9, a de-scrambling circuit 10, and a television receiver 11. The receiving station 2 receives the SHF-band television signal from the communication satellite 3 via an antenna 8. The received SHF-band television signal is converted by the converter 9 into a corresponding down-converted television signal (a corresponding UHF-band or VHF-band television signal) through a suitable process such as an FM demodulation process. The down-converted television signal is subjected by the de-scrambling circuit 10 to a conversion inverse with respect to the conversion by the scrambling circuit 5 in the transmitting station 1, so that the original standard-format television signal is restored from the down-converted television signal. The restored standard-format television signal is fed to the television receiver 11, and the video and audio information represented by the standard-format television signal is reproduced by the television receiver 11.

A receiving station which lacks a de-scrambling circuit can not recover the original standard-format television signal from the SHF-band television signal transmitted from the communication satellite 3.

In the transmitting station 1, the standard-format television signal generated by the television signal generator 4 has a waveform such as shown in FIG. 2. The scrambling circuit 5 processes and converts the standard-format television signal into the special-format television signal which has a waveform such as shown in FIG. 3. Specifically, the scrambling circuit 5 removes a serrated vertical sync pulse and adjacent equalizing pulses from the standard-format television signal, and adds an identification signal (an ID signal) to the standard-format television signal at a predetermined position within a vertical blanking period. The ID signal is composed of predetermined codes.

Figure 4:
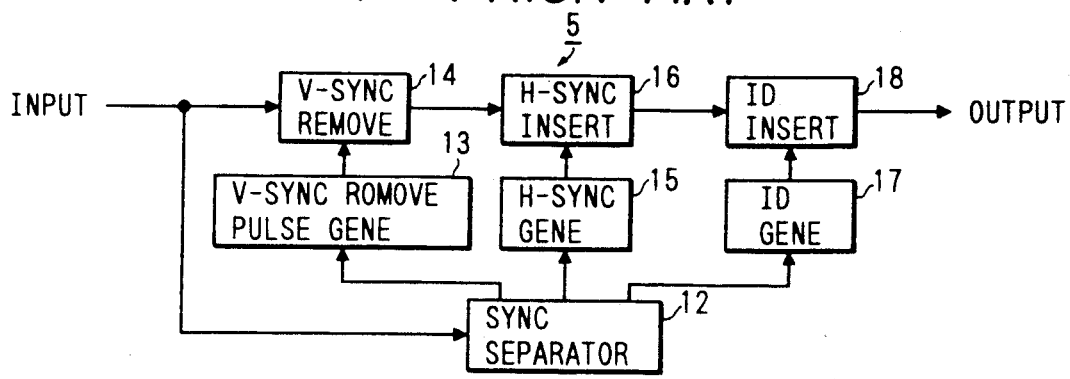
FIG. 4 is a block diagram of the prior art scrambling circuit of FIG. 1.

The scrambling circuit 5 will be further described. As shown in FIG. 4, the scrambling circuit 5 includes a sync separator 12 which separates sync signals from the standard-format television signal (see FIG. 2) generated by the television signal generator 4. A pulse generator 13 generates vertical sync signal removing pulses in response to an output signal from the sync separator 12. Each of the vertical sync signal removing pulses occurs during a period where a vertical sync signal is present. A vertical sync signal removing circuit 14 gates the standard-format television signal in response to the vertical sync signal removing pulses, and removes the vertical sync signal from the standard-format television signal by erasing information from the time segment of the standard-format television signal during which the vertical sync signal is present. A horizontal sync signal generator 15 generates a horizontal sync signal in response to an output signal from the sync separator 12. A horizontal sync signal inserting circuit 16 adds the horizontal sync signal into the time segment of the output signal from the vertical sync signal removing circuit 14 which corresponds to the period from which the vertical sync signal is removed. An ID signal generator 17 generates an ID signal of given codes in response to an output signal from the sync separator 12. The ID signal occurs during predetermined two successive horizontal scanning intervals within a vertical blanking period. An ID signal inserting circuit 18 adds the ID signal into the output signal from the horizontal signal inserting circuit 16, generating the special-format television signal or the scrambled television signal (see FIG. 3).

Figure 5:
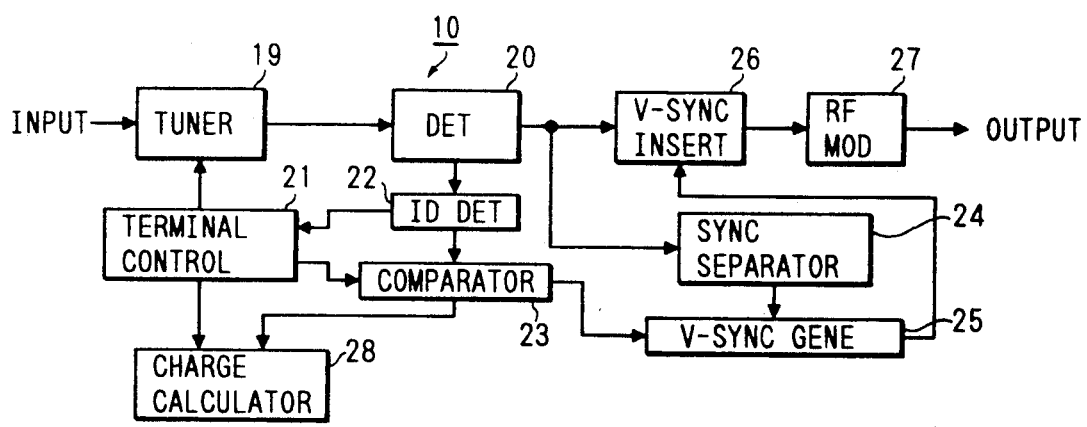
FIG. 5 is a block diagram of the prior art de-scrambling circuit of FIG. 1.

As shown in FIG. 5, the de-scrambling circuit 10 in the receiving station 2 includes a tuner 19 selects a signal of a desired frequency channel from the output VHF-band or UHF-band television signal of the converter 9. The selected television signal is subjected by a detector 20 to video detection. The selected channel is designated by a channel selector within a terminal controller 21. The terminal controller 21 also has a section for generating a reference signal of codes equal to the codes composing the ID signal in the transmitting station 1. The reference signal generating section of the terminal controller 21 is formed by using a suitable device such as a magnetic card or a ROM. An ID signal detector 22 detects an ID signal from an output signal of the video detector 20 by using a suitable device such as a shift register. A comparator 23 compares the detected ID signal with the reference signal generated by the terminal controller 21, and generates an agreement signal when the detected ID signal agrees with the reference signal. A sync separator 24 separates a horizontal sync signal from the output signal of the video detector 20. A vertical sync signal generator 25 generates a vertical sync signal on the basis of the separated horizontal sync signal, the vertical sync signal being equivalent to the vertical sync signal of the standard-format television signal. The timing of the generation of the vertical sync signal is determined by the agreement signal fed from the comparator 23 so that the vertical sync signal will occur at a time position equal to the time position of the vertical sync signal of the standard-format television signal. A vertical sync signal inserting circuit 26 adds the generated vertical sync signal into the output signal of the video detector 20, recovering the standard-format television signal (see FIG. 2). An RF modulator 27 modulates the carrier signal of a given frequency channel with the standard-television signal, converting the standard-format television signal into a corresponding RF television signal which is fed to the television receiver 11. A calculator 28 calculates the charge in response to a channel designating signal outputted from the terminal controller 21, and the agreement signal outputted from the comparator 23. Data representing the calculated charge are printed on a sheet or stored into a memory.

Japanese published unexamined patent application 50-12911 also discloses a scrambling and de-scrambling technique in which a portion of the vertical sync signal of a television signal is removed or suppressed to scramble the television signal in a transmitter side, and the portion of the vertical sync signal is restored in a receiver side.

Figure 6:
FIGS. 6 and 7 are time-domain diagrams showing the waveforms of scrambled television signals in prior art scrambling techniques.
Figure 7:
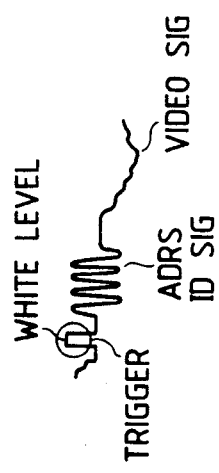

Japanese published unexamined patent application 49-24530 discloses a scrambling and de-scrambling technique in which sync pulses of a television signal in one or both of a horizontal blanking period and a vertical blanking period are replaced by an address identification signal (an address ID signal) in a transmitter side as shown in FIG. 6, and the address ID signal is designed so as to be receivable by only a special receiver. In addition, Japanese application 49-24530 discloses the addition of a trigger signal into the television signal containing the address ID signal as shown in FIG. 7. In the receiver side, the trigger signal is used to generate a horizontal sync signal.

The previously-mentioned prior art television signal scrambling and de-scrambling techniques of Japanese applications 57-121385, 56-106476, 50-12911, and 49-24530 have some problems as follows.

According to the prior art technique of Japanese application 57-121385, a de-scrambling key signal is added into the audio-information carrier of a television signal. Therefore, in the case where a converter in a receiver side is connected in a manner such that the audio-information carrier is not inputted into the converter, or in the case where the audio-information carrier is contaminated by noise so that the key signal is not reproduced, the television signal de-scrambling can not be executed successfully.

In the prior art technique of Japanese application 56-106476, the television signal scrambling is executed by removing only a vertical sync signal from a television signal and adding a pseudo horizontal sync signal for the vertical sync signal. Thus, in a receiver side of a nonsubscriber, the television signal de-scrambling can be done by using the pseudo horizontal sync signal.

The prior art technique of Japanese application 50-12911 executes the television signal scrambling by removing only a portion of the vertical sync signal from a television signal. Accordingly, the degree of the secrecy of the television signal in the prior art technique of Japanese application 50-12911 is similar to the degree of the secrecy of the television signal in the prior art technique of Japanese application 56-106476.

The prior art technique of Japanese application 49-24530 is better than the prior art techniques of Japanese applications 57-121385, 56-106476, and 50-12911 in the degree of the secrecy of the television signal. This advantage of the prior art technique of Japanese application 49-24530 results from a complexity of the television signal scrambling and de-scrambling processes. According to the prior art technique of Japanese application 49-24530, the television signal scrambling is executed by replacing the sync signal of the television signal with address information and adding a trigger signal to the television signal in a transmitter side. Specifically, the trigger signal is added to the television signal at a time having a predetermined relation with the moment of the occurrence of the added address information. In a receiver side, when the received address information agrees with prestored reference data, the trigger signal can be detected. A horizontal sync reproducing circuit is started to operate in response to the detected trigger signal. The operation of the horizontal sync reproducing circuit generates a horizontal sync signal and a vertical sync signal which are added to the received television signal to de-scramble the received television signal. Since the trigger signal is added to the television signal at a time having a predetermined relation with the moment of the occurrence of the added address information, the television signal de-scrambling process can be done by detecting the trigger signal and using the detected trigger signal in a receiver side of a nonsubcriber.

DESCRIPTION OF THE FIRST PREFERRED EMBODIMENT

Figure 8:
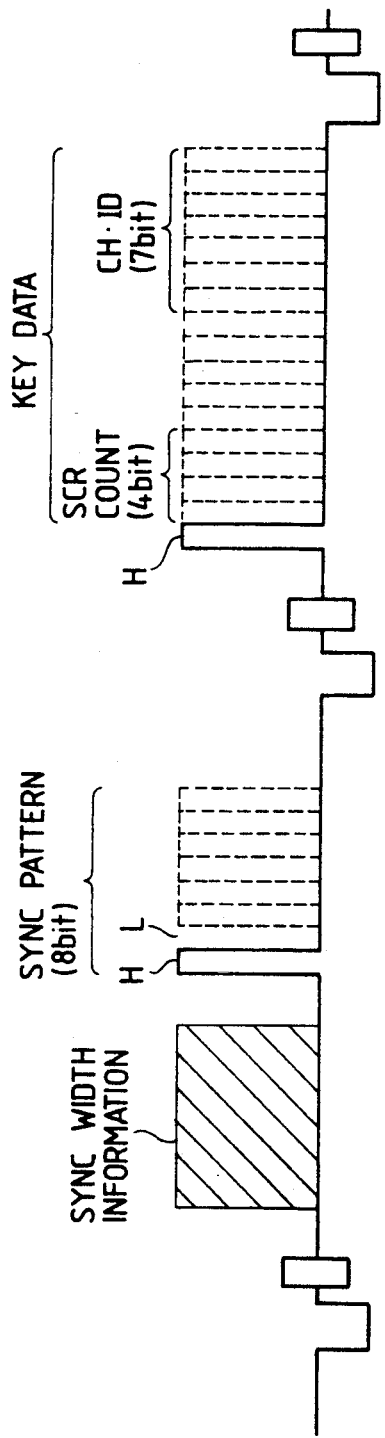
FIG. 8 is a time-domain diagram showing the waveform of a scrambled television signal in a cable television system according to a first embodiment of this invention.

FIG. 8 is a time-domain diagram of a scrambled television signal in a cable television system according to a first embodiment of this invention. The scrambled television signal is generated by suppressing a horizontal sync signal and a vertical sync signal of a standard-format television signal. As shown in FIG. 8, during a vertical blanking period, the scrambled television signal contains a sync width information signal, a sync pattern signal, and a key data signal.

The sync width information signal starts to occur at a moment which follows the moment of the end of a suppressed horizontal sync pulse by a predetermined short interval. The sync width information signal is composed of a sinusoidal signal having a frequency of 2.5 MHz which resides within the video frequency band of the standard-format television signal. The sync width information signal lasts for a predetermined interval, for example, about 20 microseconds.

The sync pattern signal follows the sync width information signal by a predetermined short interval. The sync pattern signal has a sequence of 8 bits. The first bit of the sync pattern signal is used as a marker signal. The sync pattern signal is designed relative to the sync width information signal so that the sync pattern signal can be extracted from the television signal by use of an edge of a sync width pulse signal which is obtained by the demodulation of the sync width information signal. In a receiver side, the sync pattern signal is converted into corresponding sync pattern data represented by a combination of "1" and "0", and the sync pattern data are compared with prestored reference data to decide whether or not the detected sync width pulse signal can be used as a reference for reproducing sync signals.

The sync pattern signal may be omitted, and sync signals may be reproduced on the basis of only the sync width information signal. In this case, it is necessary that the time-domain variation of the sync width information signal is approximately null.

After the sync pattern signal ends, a horizontal sync pulse occurs and then the key data signal occurs. The key data signal includes a sequence of 16 key data bits which follows a H-level tag bit. Four former bits of the key data represent a scrambling counter signal. Five intermediate bits of the key data represent a reserve data signal. Seven latter bits of the key data represent a channel identification signal (a channel ID signal). The scrambling counter signal indicates the mode of scrambling. In this embodiment, the scrambling counter signal indicates the level of the suppression of the sync signals. As will be made clear later, the executed scrambling is changed among different modes, and specifically the sync suppression level is changed among different values. While the reserve data signal is not used in this embodiment, the reserve data signal may be used as a code data signal which indicates the subscription service level of a subscriber. The channel ID signal indicates the frequency channel of the transmitted scrambled television signal. The channel ID signal prevents the user from wrongfully converting the nonsubscribed-channel television signal into the subscribed-channel television signal to watch the nonsubscribed-television signal. In a receiver side, a suitable device such as a microcomputer compares the extracted channel ID signal with a reference signal representing the frequency channel received by a converter, and the reception of the television signal is inhibited when the extracted channel ID signal disagrees with the reference signal.

The cable television system of this embodiment includes a transmitting station, receiving stations, and cables connecting the transmitting station to the receiving stations.

Figure 9:
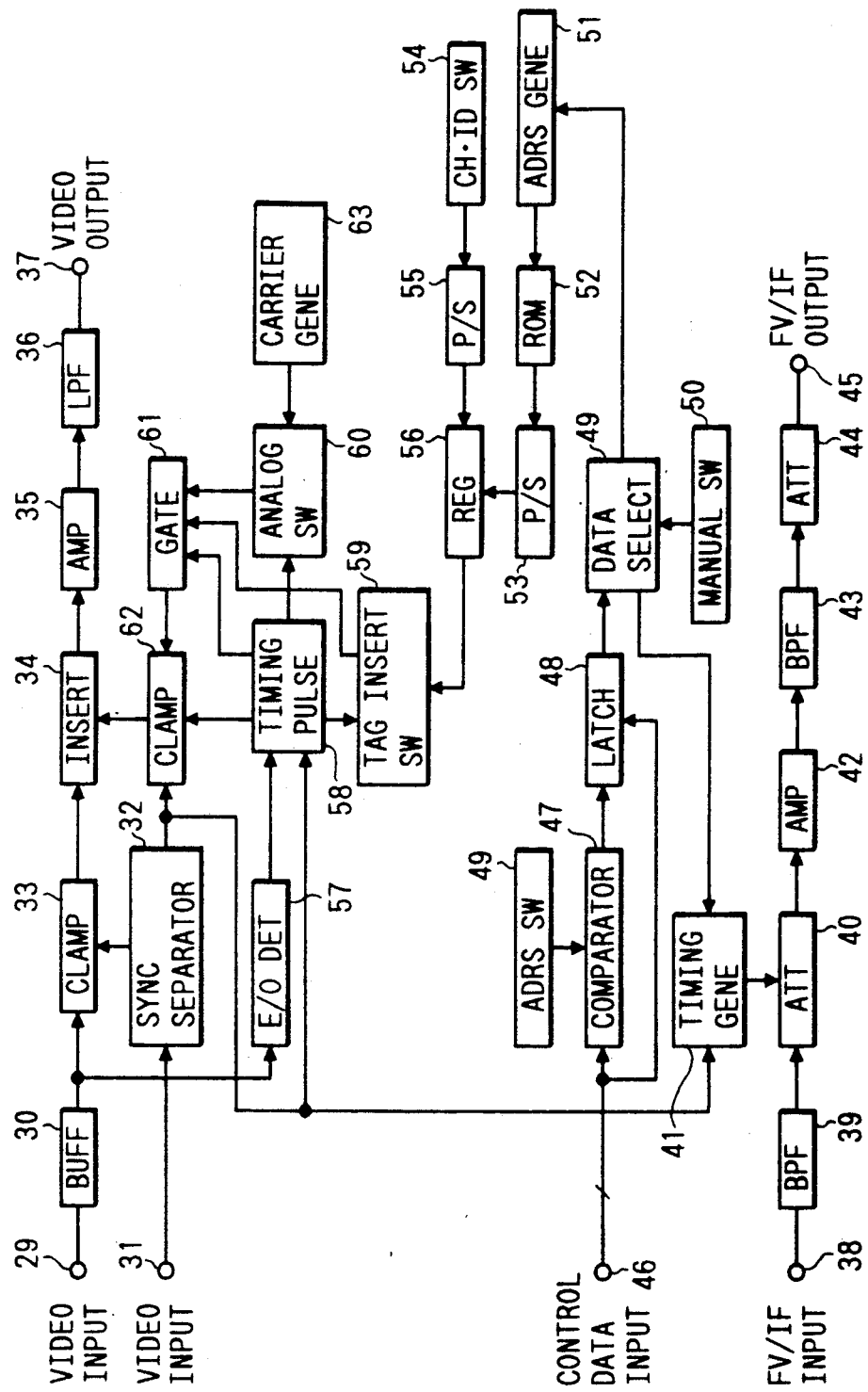
FIG. 9 is a block diagram of a portion of a transmitting station in the cable television system according to the first embodiment of this invention.

As shown in FIG. 9, the transmitting station includes a video input terminal 29 via which a standard-format television signal is inputted into a buffer amplifier 30. The input standard-format television signal is amplified by the buffer amplifier 30 to a given signal level. The standard-format television signal is also inputted via a video input terminal 31 into a sync separator 32. Horizontal and vertical sync signals are separated from the standard-format television signal by the sync separator 32.

The standard-format television signal outputted from the buffer amplifier 30 is fed to a clamping circuit 33, being subjected by the clamping circuit 33 to sync clamping in response to the horizontal and vertical sync signals fed from the sync separator 32. The sync claiming stabilizes the signal level of the standard-format television signal. The stabilized standard-format television signal is fed from the clamping circuit 33 to an inserter 34. The sync width information signal, the sync pattern signal, and the key data signal are inserted into the standard-format television signal by the inserter 34. The control of the inserter 34 will be described later.

The output television signal from the inserter 34 which contains the sync width information signal, the sync pattern signal, and the key data signal is amplified by an amplifier 35, being processed by a low pass filter 36 for noise removal and then being transmitted via an output terminal 37 to a modulator (not shown). The modulator converts the television signal into a corresponding video intermediate-frequency signal (a corresponding VIF signal) through a modulating process.

The VIF signal is inputted via an input terminal 38 to a band pass filter 39, being processed by the band pass filter 39 for noise removal and then being fed to an attenuator 40. The attenuator 40 includes three circuit blocks which are designed to give attenuations of 0 dB, 6 dB, and 10 dB to the VIF signal respectively. One of the three circuit blocks of the attenuator 40 is selected and activated in response to a timing signal fed from a timing signal generator 41. The timing signal generator 41 receives the horizontal and vertical sync signals from the sync separator 32, so that the timing signal generator 41 outputs the timing signal synchronously with the received horizontal and vertical sync signals. The attenuator 40 suppresses horizontal and vertical sync signals of the VIF signal, outputting the sync-suppressed scrambled VIF signal. The selection of one of the three circuit blocks of the attenuator 40 will be described later.

The scrambled VIF signal outputted from the attenuator 40 is subjected to a noise removing process and an amplitude-level adjusting process by a series combination of an amplifier 42, a band pass filter 43, and an attenuator 44, being transmitted via an output terminal 45 to a modulator (not shown). The modulator converts the scrambled VIF signal into a corresponding radio-frequency television signal (a corresponding RF television signal) through a modulating process. The RF television signal is fed to a cable (not shown) leading to the receiving stations.

The transmitting station includes a computer for controlling the whole of the network of the cable television system. The computer outputs a control data signal which is used in controlling the attenuator 40 as described later. The control data signal contains various signals such as a signal determining the sync suppression level and a signal (a local/remote signal) indicating which of the output data from the computer and a keyboard is used in determining the sync suppression level.

The control data signal from the computer is inputted via an input terminal 46 into a comparator 47 and a latch 48. The comparator 47 receives an address signal in the control data signal which precedes an instruction signal in the control data signal. The received address signal is compared by the comparator 47 with a reference address signal fed from an address switch circuit 49. When the received address signal agrees with the reference address signal, the comparator 47 outputs a control signal to the latch 48 which activates the latch 48. The comparison between the address signals by the comparator 47 is executed to confirm whether the control data signal fed from the computer actually relates to this transmitting station. For this purpose, the reference address signal outputted from the address switch circuit 49 is preset so as to represent the address assigned to this transmitting station. When the latch 48 is activated by the control signal from the comparator 47, the control data signal from the computer is latched by the latch 48. The latched control data signal is fed from the latch 48 to a data selector 49.

The data selector 49 executes data selection in response to the local/remote signal in the control data signal. Specifically, when the local/remote signal assumes a local-mode state, the data selector 49 selects a scrambling-mode designating signal fed from a manual switch (SW) circuit 50 including a keyboard. When the local/remote signal assumes a remote-mode state, the data selector 49 selects a scrambling-mode designating signal in the control data signal fed from the computer.

It is now assumed that the scrambling-mode designating signal in the control data signal fed from the computer is selected by the data selector 49. The scrambling-mode designating signal is fed from the data selector 49 to the timing signal generator 41 and an address generator 51. The timing signal generator 41 controls the state of the output timing signal in response to the scrambling-mode designating signal so that one of the three circuit blocks of the attenuator 40 will be selected and activated in response to the scrambling-mode designating signal.

The address generator 51 serves to generate the scrambling counter signal in cooperation with a read-only memory (a ROM) 52 and a parallel-to-serial converter (a P/S converter) 53. The address generator 51 outputs an address signal to the ROM 52, the address signal depending on the scrambling-mode designating signal. A scrambling counter digital signal of a 4-bit parallel form is read out from the ROM 52 in response to the address signal. The scrambling counter digital signal read out from the ROM 52 depends on the address signal and thus depends on the scrambling-mode designating signal. The 4-bit parallel scrambling counter digital signal read out from the ROM 52 is converted by the P/S converter 53 into a corresponding 4-bit serial scrambling counter digital signal. The state of the scrambling counter signal outputted from the P/S converter 53 depends on the scrambling-mode designating signal. For example, the state of the scrambling counter signal is "0,0,0,0" and "0,0,1,0" when the scrambling-mode designating signal corresponds to a desired attenuation of 0 dB and 6 dB in the attenuator 40 respectively.

The ROM 52 also outputs a sync pattern digital signal of a parallel form which depends on the address signal. The parallel sync pattern digital signal outputted from the ROM 52 is converted by the P/S converter 53 into a corresponding serial sync pattern digital signal.

A channel ID switch circuit 54 generates a channel ID digital signal of a 7-bit parallel form in response to a data signal representing the frequency channel of a television signal to be transmitted. The parallel channel ID digital signal generated by the channel ID switch circuit 54 is converted by a P/S converter 55 into a corresponding serial channel ID digital signal.

A register 56 receives the sync pattern signal, the scrambling counter signal, and the channel ID signal from the P/S converters 53 and 55. The register 56 arranges the scrambling counter signal and the channel ID signal in a desired order of FIG. 8 to compose the key data signal, and also arranges the sync pattern signal in a desired order relative to the key data signal. The timings of the outputting of the signals from the P/S converters 53 and 54 are controlled by timing signals fed from the computer or a microcomputer so that a desired arrangement of the sync pattern signal, the scrambling counter signal, and the channel ID signal will be obtained in the register 56. The sync pattern signal and the key data signal are sequentially read out from the register 56.

An even/odd field detector (an E/O detector) 57 receives the standard-format television signal from the buffer amplifier 30. The E/O detector 57 discriminates the current field of the standard-format television signal, that is, detects whether the current field of the standard-format television signal is even or odd. When the current field of the standard-format television signal is even, the E/O detector 57 outputs an L-level signal. When the current field of the standard-format television signal is odd, the E/O detector 57 outputs an H-level signal. The E/O detector 57 serves to compensate for a difference in timing between odd fields and even fields which would be caused in cases where timing setting would be done at a fixed period and the inserter 34 would be operated under these conditions.

A timing pulse generator 58 receives the output signal from the E/O detector 57, and also receives the horizontal and vertical sync signals from the sync separator 32. The timing pulse generator 58 generate various timing pulse signals in response to the output signal from the E/O detector 57, and the horizontal and vertical sync signals. Specifically, the timing pulse generator 58 includes counters counting clock pulses and responding to the output signal from the E/O detector 57 and the horizontal and vertical sync signals to generate the timing pulse signals. The timing pulse signals are outputted from the timing pulse generator 58 to a tag-insertion line switch circuit 59, an analog switch 60, a gate 61, and a clamping circuit 62 respectively.

The tag-insertion line switching circuit 59 sequentially receives the sync pattern signal and the key data signal from the register 56, and adds an H-level tag signal before each of the sync pattern signal and the key data signal in response to the timing pulse signal fed from the timing pulse generator 58. In a receiver side, the tag signal preceding the key data signal is used as a flag which enables reliable detection of the scrambling counter signal and the channel ID signal contained in the key data signal.

A carrier generator 63 outputs a 2.5-MHz sinusoidal carrier to the analog switch 60. The analog switch 60 is periodically opened and closed in response to the timing pulse signal fed from the timing pulse generator 58. When the analog switch 60 is closed, the carrier passes through the analog switch 60. When the analog switch 60 is opened, the carrier is inhibited from passing through the analog switch 60. Specifically, the carrier is periodically passed through the analog switch 60 for a predetermined length of time, for example, about 20 microseconds, and thereby the analog switch 60 outputs the burst-like sync width information signal.

The gate 61 receives a set of the tag signal and the sync pattern signal and a set of the tag signal and the key signal from the tag-insertion line switch circuit 59, and also receives the sync width information signal from the analog switch 60. The gate 61 combines the sync width information signal, the set of the tag signal and the sync pattern signal, and the set of the tag signal and the key signal in a desired sequence of FIG. 8 in response to the timing pulse signal fed from the timing pulse generator 58. Thus, the output signal from the gate 61 represents the sequence of the sync width information signal, the set of the tag signal and the sync pattern signal, and the set of the tag signal and the key signal.

The clamping circuit 62 receives the output signal from the gate 61, and also receives the horizontal and vertical sync signals from the sync separator 32. The clamping circuit 62 clamps the output signal from the gate 61 in response to the horizontal and vertical sync signals and also the timing pulse signal fed from the timing pulse generator 58. The clamping levels in the clamping circuits 33 and 62 are preferably set to a common dc level with respect to, for example, a pedestal level so that an unnatural level difference will not occur during the signal inserting process by the inserter 34.

The output signal from the clamping circuit 62 is inserted by the inserter 34 into the sync-suppressed scrambled television signal outputted from the clamping circuit 33, so that the sync width information signal, the set of the tag signal and the sync pattern signal, and the set of the tag signal and the key signal are sequentially inserted into or superimposed on the sync-suppressed scrambled television signal.

The transmitting station transmits an audio-information signal to the receiving stations via the cables in a known way. In addition, the transmitting station transmits a frequency-shift-modulated data signal (an FSK modulated data signal) to the receiving stations via the cables by using a frequency band which does not interfere with the television signal and the audio-information signal. The FSK modulated data signal includes a 1-bit or 2-bit data signal, an address signal, or a charge information signal. In a receiver side, the 1-bit or 2-bit data signal is used to finally detect the scrambling mode while being combined with the scrambling counter signal.

Figure 16:
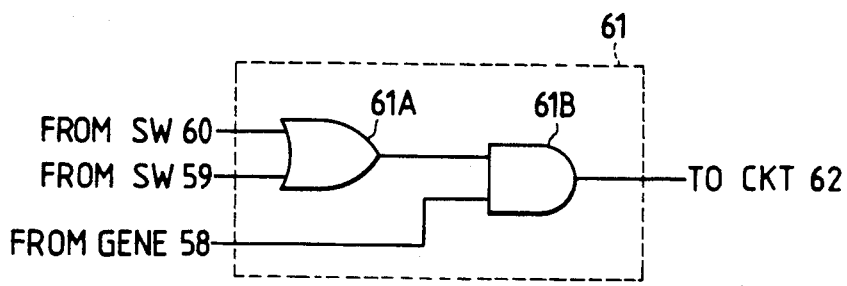
FIG. 16 is a block diagram of the gate of FIG. 9.
Figure 17:
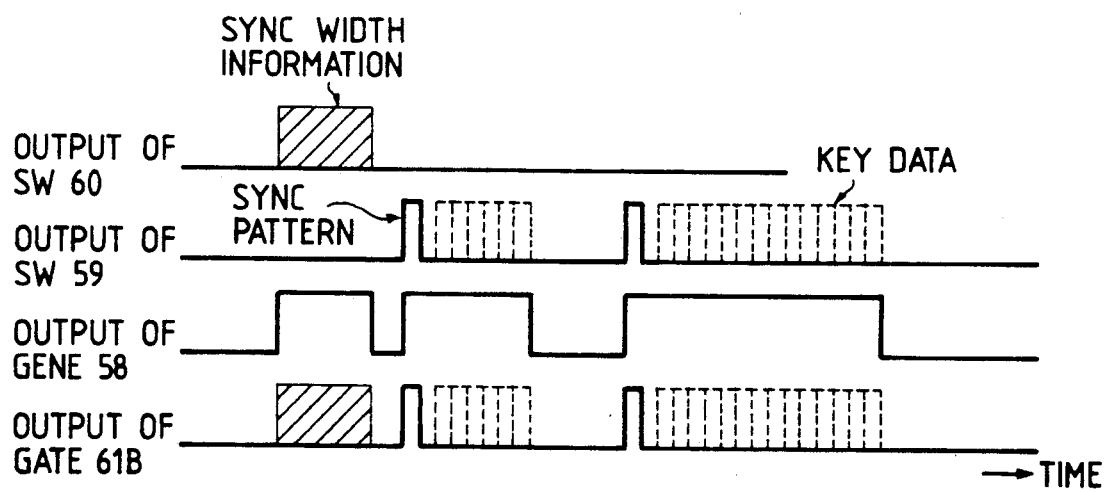
FIG. 17 is a timing diagram showing the waveforms of signals inputted into and outputted from the gate of FIG. 16.

As shown in FIG. 16, the gate 61 includes a combination of gate elements 61A and 61B. Input terminals of the gate element 61A receive the output signals from the tag-insertion line switch circuit 59 and the analog switch 60 respectively. The output signal from the gate element 61A is fed to a first input terminal of the gate element 61B. A second input terminal of the gate element 61B receives the output signal from the timing pulse generator 58. The output signal from the gate element 61B is fed to the clamping circuit 62. As shown in FIG. 17, the output signal from the analog switch 60 contains the sync width information, and the output signal from the tag-insertion line switch circuit 59 contains the sync pattern and the key data. In addition, the output signal from the timing pulse generator 58 contains gate pulses which correspond to the sync width information, the sync pattern, and the key data respectively. The output signals from the devices 58-60 are combined by the gate elements 61A and 61B into a signal which appears as the output signal from the gate element 61B. As shown in FIG. 17, the output signal from the gate element 61B contains a sequence of the sync width information, the sync pattern, and the key data.

Figure 10:
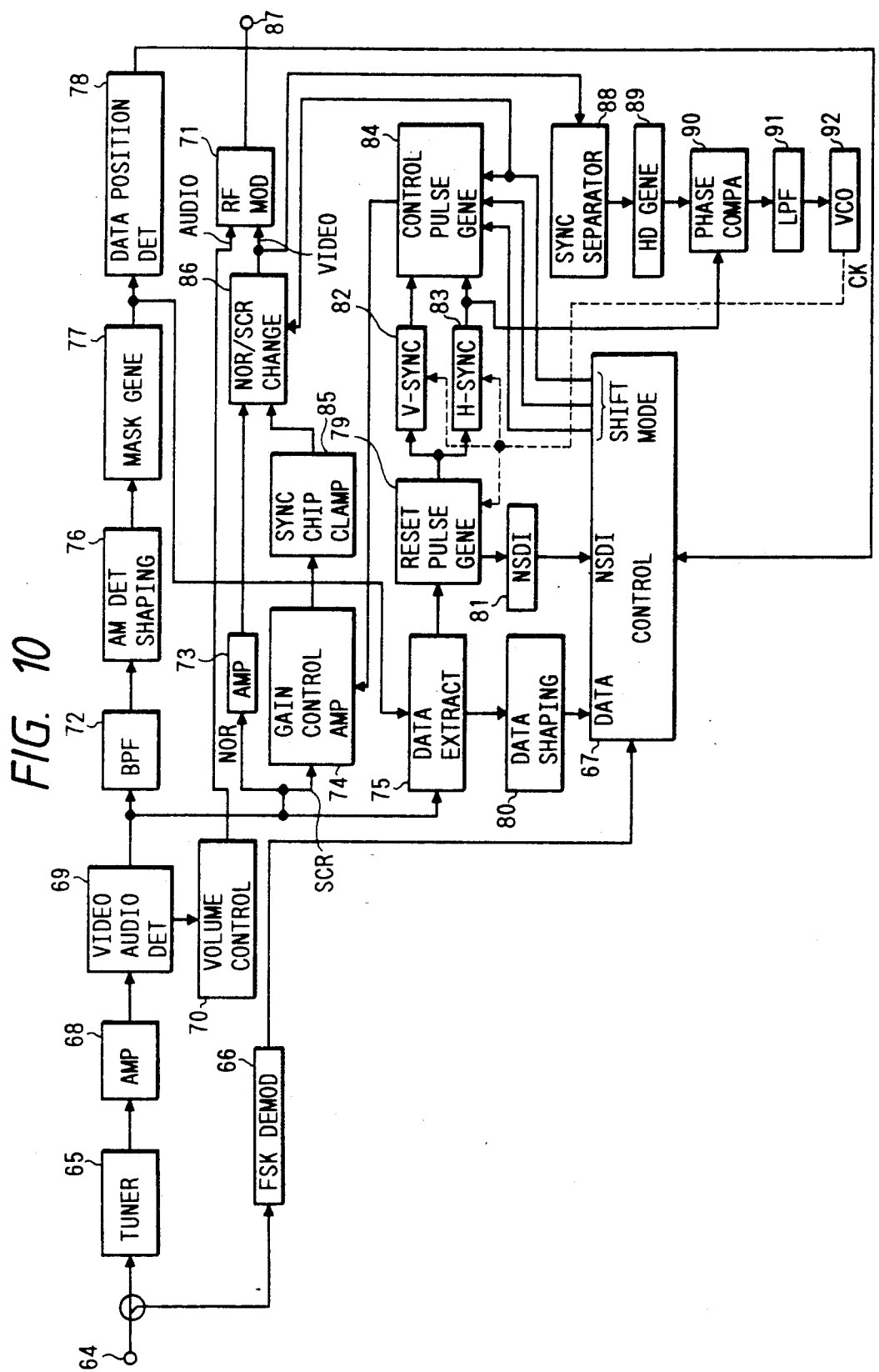
FIG. 10 is a block diagram of a portion of a receiving station in the cable television system according to the first embodiment of this invention.

As shown in FIG. 10, the receiving station includes an input terminal 64 connected to the cable and receiving an RF signal composed of the scrambled television signal, the audio-information signal, and the FSK modulated data signal from the transmitting station via the cable. The scrambled television signal and the audio-information signal are fed via the input terminal 64 to a known tuner 65. The FSK modulated data signal is fed via the input terminal 64 to an FSK demodulator 66. The FSK modulated data signal is subjected by the FSK demodulator 66 to an FSK demodulation process, so that the original data signal is recovered from the FSK modulated data signal. The recovered data signal is stored into a memory within a controller 67. As described previously, the data signal recovered from the FSK modulated data signal has a component (a scrambling-mode detecting signal) which is designed to enable the final detection of the scrambling mode while being combined with the scrambling counter signal.

The tuner 65 converts the RF scrambled television signal and the RF audio-information signal into corresponding VIF scrambled television signal and SIF audio-information signal. The VIF scrambled television signal and the SIF audio-information signal are outputted from the tuner 65 to a known amplifier 68, being amplified by the amplifier 68 to a predetermined level and then being fed to a known video and audio detector 69.

The video and audio detector 69 recovers the original scrambled television signal and the original audio-information signal from the VIF scrambled television signal and the SIF audio-information signal respectively. The recovered audio-information signal is fed from the video and audio detector 69 to a volume controller 70, being adjusted in signal level by the volume controller 70 and then being fed to an RF modulator 71 constituting an output circuit of a de-scrambler of the receiving station. The audio-information signal is subjected by the RF modulator 71 to RF modulation, and the resulting RF modulated audio-information signal is transmitted via an output terminal 87 of the de-scrambler to a television receiver. The recovered scrambled television signal is fed from the video and audio detector 69 to a band pass filter (a BPF) 72, an amplifier 73, a gain control amplifier 74, and a bit pattern data extractor 75.

The band pass filter 72 serves to extract the burst-like sync width information signal from the scrambled television signal. The sync width information signal extracted by the band pass filter 72 is fed to an AM (amplitude modulation) detector and wave shaper circuit 76. Since the sync width information signal is composed of 2.5-MHz amplitude-modulation waves, it is sufficient that the pass band of the band pass filter 72 is narrow.

The amplifier 73 serves to amplify the scrambled television signal. The output scrambled television signal from the amplifier 73 is fed to a normal/scramble change circuit 86.

The gain control amplifier 74 basically serves to amplify the scrambled television signal at a gain determined by a gain control signal. Specifically, the gain control amplifier 74 attenuates times segments of the scrambled television signal other than predetermined time segments to be amplified, and then amplifies the whole of the scrambled television signal. The output television signal from the gain control amplifier 74 is fed to a sync chip clamping circuit 85.

The bit pattern data extractor 75 serves to extract the sync pattern signal and the key data signal from the scrambled television signal. The sync pattern signal extracted by the bit pattern data extractor 75 is fed to a reset pulse generator 79. The key data signal extracted by the bit pattern data extractor 75 is fed to a data shaper 80.

The sync width information signal is subjected by the AM detector and wave shaper circuit 76 to an AM detection process and a wave shaping process, so that the circuit 76 outputs a sync width pulse signal having a pulse width equal to the duration of the burst-like sync width information signal. The pulse width of the sync width pulse signal is equal to about 20 microseconds. The sync width pulse signal is fed from the AM detector and wave shaper circuit 76 to a bit pattern data mask generator 77. The bit pattern data mask generator 77 generates first and second window signals (first and second mask signals) in response to the sync width pulse signal. The first window signal is designed for extracting the sync pattern signal. The second window signal is designed for extracting the key data signal. Specifically, the first window signal contains a pulse which is generated by using the trailing edge of a pulse of the sync width pulse signal as a trigger. The width of the pulse of the first window signal is longer than the duration of the sync pattern signal. The leading edge of the pulse of the first window signal occurs immediately before the moment of the occurrence of the start bit of the sync pattern signal. The trailing edge of the pulse of the first window signal occurs immediately after the moment of the occurrence of the end bit of the sync pattern signal. The second window signal contains a pulse which is generated by using the trailing edge of a pulse of the sync width pulse signal as a trigger. The width of the pulse of the second window signal is longer than the duration of the key data signal. The leading edge of the pulse of the second window signal occurs immediately before the moment of the occurrence of the start bit of the key data signal. The trailing edge of the pulse of the second window signal occurs immediately after the moment of the occurrence of the end bit of the key data signal. The second window signal may be designed for extracting only the key data signal or both the combination of the tag signal and the key data signal. For example, the bit pattern data mask generator 77 is composed of counters controlled by the sync width pulse signal and counting clock pulses.

The first and second window signals are fed from the bit pattern data mask generator 77 to the bit pattern data extractor 75 as control signals. The bit pattern data extractor 75 gates the scrambled television signal in response to the first and second window signals, extracting the sync pattern signal and the key data signal from the scrambled television signal. The first and second window signals are also fed from the bit pattern data mask generator 77 to a data position detector 78. The presence and absence of the first and second window signals are detected by the data position detector 78. The output signal from the data position detector 78 is fed to the controller 67, instructing the start of the signal processing operation of the controller 67.

As described previously, the sync pattern signal extracted by the bit pattern data extractor 75 is fed to the reset pulse generator 79. The reset pulse generator 79 includes a memory and a comparator. The memory stores a reference sync pattern signal. The reference sync pattern signal is fed from the memory to the comparator, being compared by the comparator with the extracted sync pattern signal. When the extracted sync pattern signal and the reference sync pattern signal agree with each other, the comparator outputs an agreement detection signal.

The agreement detection signal is fed from the reset pulse generator 79 to an NSDI circuit 81. In the case where the NSDI circuit 81 continues to receive the agreement detection signal for a given number of successive vertical blanking periods, the NSDI circuit 81 outputs an NSDI signal to the controller 67. The NSDI signal represents that the subscriber related to this receiving station is permitted to watch a broadcasting program of the currently-received television signal.

As described previously, the key data signal extracted by the bit pattern data extractor 75 is fed to the data shaper 80. The data shaper 80 includes a data shaping section and a serial-to-parallel converter, shaping the key data signal and converting the key data signal into a corresponding parallel key data digital signal. The parallel key data digital signal is fed from the data shaper 80 to the controller 67.

As described previously, the signal processing operation of the controller 67 is started by the output signal from the data position detector 78. During the signal processing operation, the controller 67 starts a scrambling-mode detecting process in response to the NSDI signal. In the scrambling-mode detecting process, the controller 67 combines the scrambling counter signal and the scrambling-mode detecting signal into a table of a matrix arrangement, and the controller 67 detects the mode of the currently-executed scrambling by analyzing the matrix table.

The result of the scrambling-mode detecting process is represented by a 3-bit shift mode data signal which is outputted from a shift mode output terminal of the controller 67. Two bits of the 3-bit shift mode data signal compose a data signal representing the sync suppression level of the currently-received television signal. The remaining one bit of the 3-bit shift mode data signal constitutes an NSDO signal representing whether or not the currently-received television signal agrees with a normal television signal, that is, whether or not the currently-received television signal agrees with a television signal to be de-scrambled. The 3-bit data signal outputted from the controller 67 is used for generating control pulses to increase the levels of the suppressed sync signals, and is also used for determining which of the output signals from the amplifier 73 and the gain control amplifier 74 should be selected.

As described previously, the reset pulse generator 79 receives the sync pattern signal from the bit pattern data extractor 75. The reset pulse generator 79 generates a reset pulse signal by using the start pulse signal or the marker signal in the sync pattern signal as a trigger. Pulses of the reset pulse signal occur at different periods corresponding to intervals T1 and T2 respectively. The interval T1 extends between the moment of the occurrence of the falling edge of a marker signal and the moment of the occurrence of the edge of a first suppressed horizontal sync pulse. The interval T2 extends between the moment of the occurrence of the edge of the first horizontal sync pulse and the moment of the occurrence of the edge of a second horizontal sync pulse. Specifically, the reset pulse generator 79 includes a combination of counters. The counter combination is started to count clock pulses by using the falling edge of the marker signal as a trigger, and outputs a first pulse when the time T1 elapses. Then, the counter combination is started to count clock pulses by using the falling edge of the first pulse, and outputs a second pulse when the time T2 elapses. The time T2 is substantially equal to one horizontal period. Third and later pulses are generated at a period equal to the time T2.

The reset pulse signal outputted from the reset pulse generator 79 is fed to a vertical sync oscillator 82 and a horizontal sync oscillator 83. The vertical sync oscillator 82 includes a counter which counts pulses of the reset pulse signal, and which outputs a pseudo vertical sync pulse when the pulse count number reaches a given number corresponding to one vertical period. The pseudo vertical sync pulse is similar in waveform to the vertical sync pulse of the standard-format television signal. The pseudo vertical sync pulse is outputted from the vertical sync oscillator 82 as a pseudo vertical sync signal. The horizontal sync oscillator 83 generates a pseudo horizontal sync signal in synchronism with the reset pulse signal. The pseudo horizontal sync signal is similar in waveform and pulse width to the horizontal sync signal of the standard-format television signal.

A control pulse generator 84 receives the pseudo vertical and horizontal sync signals from the vertical and horizontal sync oscillators 82 and 83. The control pulse generator 84 also receives the 3-bit data signal from the controller 67. The control pulse generator 84 generates three different pulse signals on the basis of the pseudo vertical and horizontal sync signals and the 3-bit data signal. In the case where the 3-bit data signal represents that the current sync suppression level is equal to 0 dB, the control pulse generator 84 generates a first pulse signal by selecting the pseudo vertical and horizontal sync signals. In the case where the 3-bit data signal represents that the current sync suppression level is equal to 6 dB, the control pulse generator 84 generates a second pulse signal by selecting the pseudo vertical and horizontal sync signals. In the case where the 3-bit data signal represents that the current sync suppression level is equal to 10 dB, the control pulse generator 84 generates a third pulse signal by selecting the pseudo vertical and horizontal sync signals.

The first, second, and third pulse signals are outputted from the control pulse generator 84 to the gain control amplifier 74. The gain control amplifier 74 includes attenuators A, B, and C and an amplifier D. The attenuators A, B, and C serve to attenuate the scrambled television signal and are controlled by the third, second, and first pulse signals respectively. In the case where the current sync suppression level is equal to 10 dB and the third pulse signal is generated, the attenuator A attenuates the scrambled television signal in response to the third pulse signal so that time segments of the scrambled television signal except the time segments corresponding to the suppressed sync signals will be attenuated by a level of 10 dB and that the suppressed sync signals will not be attenuated. Thus, the attenuator A de-scrambles the scrambled television signal, and recovers the original television signal and outputs the recovered television signal. In the case where the current sync suppression level is equal to 6 dB and the second pulse signal is generated, the attenuator B attenuates the scrambled television signal in response to the second pulse signal so that time segments of the scrambled television signal except the time segments corresponding to the suppressed sync signals will be attenuated by a level of 10 dB and that the suppressed sync signals will be attenuated by a level of 4 dB. Thus, the attenuator B de-scrambles the scrambled television signal, and recovers the original television signal and outputs the recovered television signal. In the case where the current sync suppression level is equal to 0 dB and the third pulse signal is generated, the attenuator C attenuates the input television signal in response to the third pulse signal so that all time segments of the television signal will be attenuated by a level of 10 dB. Thus, the attenuator C conducts the input television signal while continuously attenuating the same. The television signals outputted from the attenuators A, B, and C are amplified by the amplifier D to a predetermined level, being outputted from the gain control amplifier 74.

A sync chip clamping circuit 85 receives the de-scrambled television signal from the gain control amplifier 74. The sync chip clamping circuit 85 clamps the received television signal at a sync level. The clamping process by the sync chip clamping circuit 85 is to compensate for variations in dc level which are caused during the de-scrambling process by the gain control amplifier 74.

As described previously, one bit of the 3-bit data signal outputted from the controller 67 constitutes a signal (an NSDO signal) representing whether or not the currently-received television signal agrees with a television signal to be de-scrambled. The NSDO signal is fed to the normal/scramble change circuit 86. One of the output television signals from the amplifier 73 and the gain control amplifier 74 is selected and passed to the RF modulator 71 by the normal/scramble change circuit 86 in response to the NSDO signal. Specifically, when the currently-received television signal agrees with a television signal to be de-scrambled and the NSDO signal assumes an H-level for example, the output television signal of the sync chip clamping circuit 85 is selected and passed to the RF modulator 71. When the currently-received television signal disagrees with a television signal to be de-scrambled and the NSDO signal assumes an L-level for example, the output television signal of the amplifier 73 is selected and passed to the RF modulator 71. The television signal outputted from the normal/scramble change circuit 86 is subjected by the RF modulator 71 to RF modulation, and the resulting RF modulated television signal is transmitted via the output terminal 87 of the de-scrambler to the television receiver.

In addition, the output television signal from the normal/scramble change circuit 86 is fed to a sync separator 88, and horizontal and vertical sync signals are separated from the television signal by the sync separator 88. The separated sync signals are fed to an HD generator 89, and only the horizontal sync signal is selected by and outputted from the HD generator 89. A phase comparator 90 receives the pseudo horizontal sync signal from the horizontal sync oscillator 83 and also receives the horizontal sync signal from the HD generator 89. The phase comparator 90 compares the phases of the two horizontal sync signals, and outputs a detection signal representing the difference in phase between the two horizontal sync signals. The output detection signal from the phase comparator 90 is processed by a low pass filter (LPF) 91 into a dc bias signal. The dc bias signal is fed from the low pass filter 91 to a voltage-controlled oscillator (VCO) 92. The voltage-controlled oscillator 92 outputs a corrective clock signal of a frequency which depends on the dc bias signal. The corrective clock signal is fed from the voltage-controlled oscillator 92 to the reset pulse generator 79, the vertical sync oscillator 82, and the horizontal sync oscillator 83 as a control signal for resetting the operation of the devices 79, 82, and 83. The sync separator 88, the HD generator 89, the phase comparator 90, the low pass filter 91, and the voltage-controlled oscillator 92 compose a phase-locked loop which establishes the phase lock between the pseudo sync signals and the actual sync signals. Thus, the de-scrambling process is accurately controlled in timing, and the original television signal is reliably restored.

Figure 11:
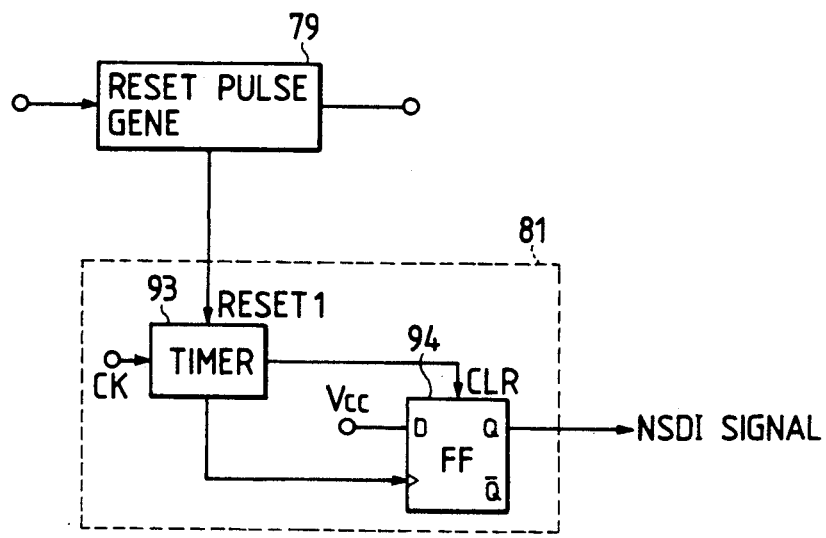
FIG. 11 is a block diagram of the NSDI circuit of FIG. 10.

As shown in FIG. 11, the NSDI circuit 81 includes a timer 93 and a flip-flop (FF) 94. The timer 93 includes a counter which counts clock pulses and which is reset by the agreement detection signal outputted from the reset pulse generator 79. In the case where the agreement detection signal remains absent for a predetermined interval, for example, three vertical periods, which is determined by the clock pulses, the timer 93 outputs a clear pulse to the flip-flop 94. Otherwise, the timer 93 transfers the agreement detection signal to the flip-flop 94.

Figure 12:
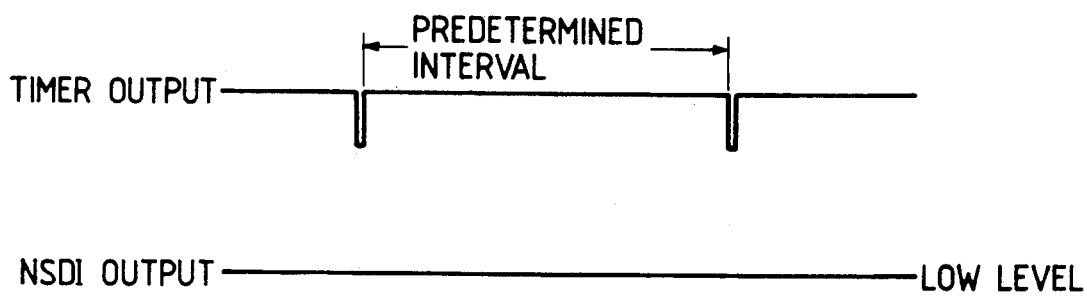
FIGS. 12 and 13 are time-domain diagrams showing the waveforms of signals in the NSDI circuit of FIG. 11.
Figure 13:
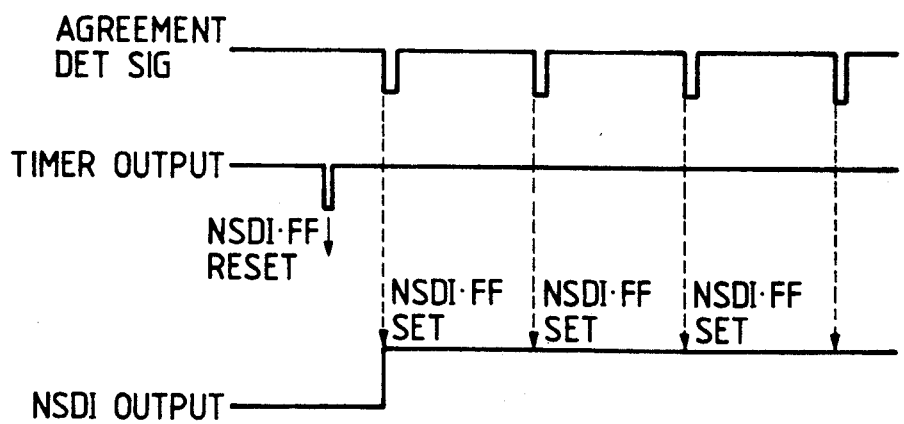

In the case where the normal television signal or the non-scrambled television signal is received by the receiving station, the agreement detection signal remains absent and thus the timer 93 periodically outputs a clear pulse to the flip-flop 94 so that the flip-flop 94 continuously outputs an L-level NSDI signal as shown in FIG. 12. In the case where the scrambled television signal is received by the receiving station, the agreement detection signal is periodically present and thus the timer 93 transfers the agreement detection signal to the flip-flop 94 so that the flip-flop 94 continuously outputs a H-level NSDI signal as shown in FIG. 13.

Figure 14:
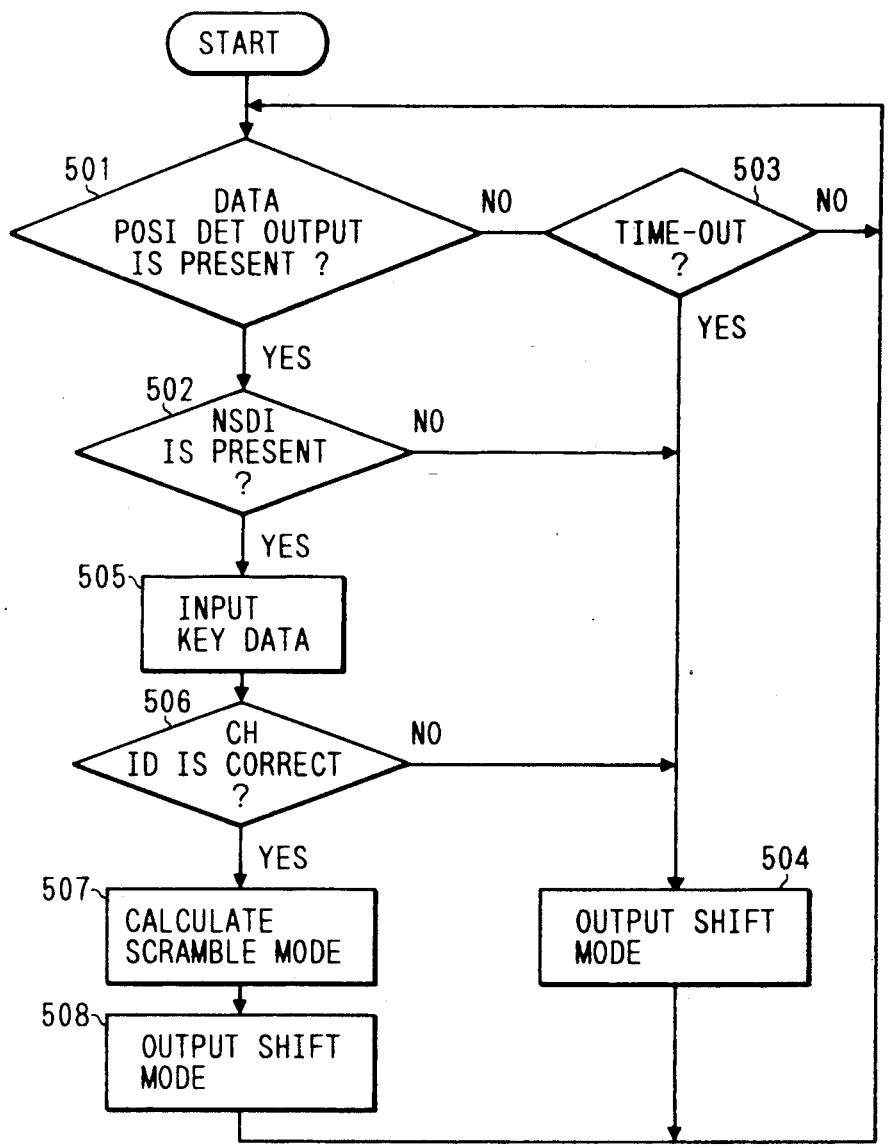
FIG. 14 is a flowchart of a segment of a program operating the controller of FIG. 10.

The controller 67 includes a microcomputer having a combination of a CPU, a ROM, a RAM, and an I/O circuit. The microcomputer operates in accordance with a program stored in the ROM. FIG. 14 is a flowchart of a segment of the program which relates to the de-scrambling process.

As shown in FIG. 14, a first step 501 of the program decides whether or not the active output signal from the data position detector 78 is present. When the active output signal from the data position detector 78 is present, the program advances from the step 501 to a step 502. Otherwise, the program advances from the step 501 to a step 503.

The step 503 decides whether or not the time elapsed from the start of the program reaches a predetermined time, for example, 200 microseconds. When the elapsed time does not reach the predetermined time, the program returns from the step 503 to the step 501. When the elapsed time reaches the predetermined time, the program advances from the step 503 to a step 504. Thus, even in the case where the active output signal from the data position detector 78 remains absent, when the predetermined time elapses, the program advances to the step 504.

The step 502 decides whether or not the H-level agreement detection signal outputted from the NSDI circuit 81 is present. When the H-level agreement detection signal is present, the program advances from the step 502 to a step 505. Otherwise, the program advances from the step 502 to the step 504.

The step 505 inputs the key data signal from the data shaper 80. After the step 505, the program advances to a step 506 which decides whether or not the channel ID signal in the key data signal is correct. When the channel ID signal is correct, the program advances from the step 506 to a step 507. Otherwise, the program advances from the step 506 to the step 504.

The step 507 calculates the scrambling mode on the basis of the scrambling counter signal in the key data signal and the FSK modulated data signal. The calculated scrambling-mode represents the sync suppression level and the NSDO information. A step 508 following the step 507 determines the state of the 3-bit shift mode signal in response to the calculated scrambling-mode, and enables the determined 3-bit shift mode signal to be outputted from the controller 67. Specifically, two bits of the 3-bit shift mode signal are set to represent the sync suppression level, and the remaining one bit is set to represent the H-level NSDO signal. After the step 508, the program returns to the step 501.

The step 504 determines the state of the 3-bit shift mode signal and enables the determined 3-bit shift mode signal to be outputted from the controller 67. Specifically, two bits of the 3-bit shift mode signal are set to represent the 0-dB sync suppression level, and the remaining one bit is set to represent the L-level NSDO signal. After the step 504, the program returns to the step 501.

Figure 18:
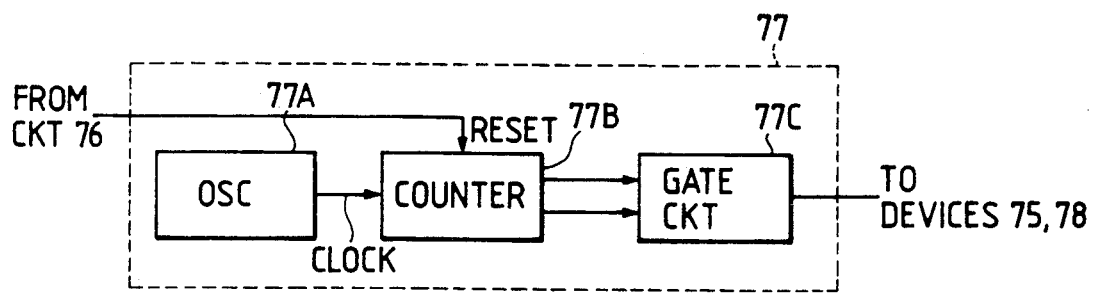
FIG. 18 is a block diagram of the bit pattern data mask generator of FIG. 10.
Figure 19:
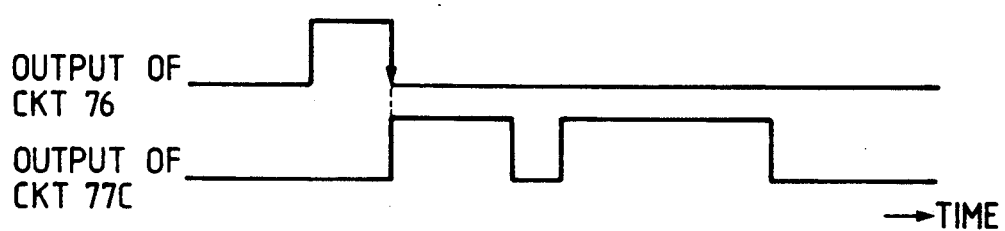
FIG. 19 is a timing diagram showing the waveforms of signals inputted into and outputted from the bit pattern data mask generator of FIG. 18.

As shown in FIG. 18, the bit pattern data mask generator 77 includes an oscillator 77A, a counter 77B, and a gate circuit 77C. The oscillator 77A outputs a clock signal to the counter 77B. The clock signal has a fixed frequency. The counter 77B counts pulses of the clock signal, dividing the frequency of the clock signal by predetermined numbers and outputting resultant signals. A reset terminal of the counter 77B receives the output signal from the AM detector and wave shaper circuit 76 which contains a pulse corresponding to the sync width information as shown in FIG. 19. The frequency-dividing process by the counter 77B is reset by the trailing edge of the pulse in the output signal from the circuit 76. The gate circuit 77C gates the output signals from the counter 77B, outputting a signal which contains pulses corresponding to the first and second window signals as shown in FIG. 19. The output signal from the gate circuit 77C is fed to the bit pattern data extractor 75 and the data position detector 78.

Figure 20:
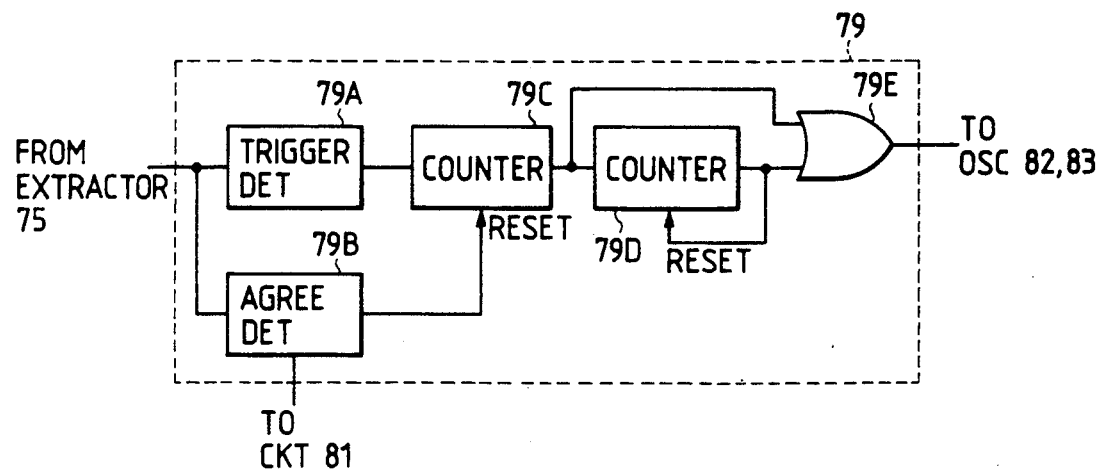
FIG. 20 is a block diagram of the reset pulse generator of FIG. 10.
Figure 21:
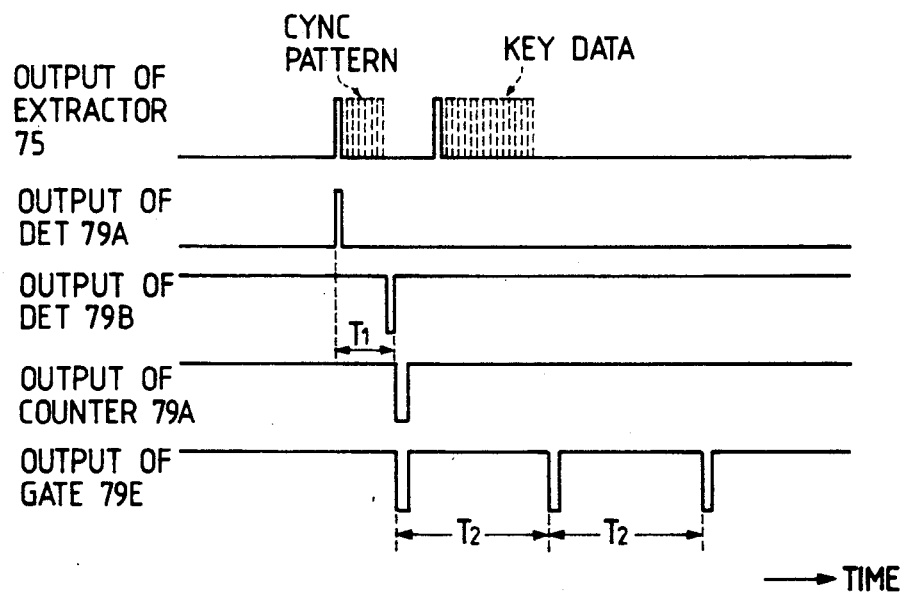
FIG. 21 is a timing diagram showing the waveforms of signals in the reset pulse generator of FIG. 20.

As shown in FIG. 20, the reset pulse generator 79 includes a trigger detector 79A, an agreement detector 79B, counters 79C and 79D, and a gate element 79E. The trigger detector 79A and the agreement detector 79B receive the output signal from the bit pattern data extractor 75 which contains the sync pattern data and the key data as shown in FIG. 21. The trigger detector 79A detects the start pulse signal (the marker trigger signal) of the sync pattern data, outputting a short pulse corresponding to the detected start pulse signal as shown in FIG. 21. The output pulse from the trigger detector 79A is fed to the counter 79C. The agreement detector 79B includes a ROM holding reference data, and a comparator comparing the sync pattern data with the reference data. When the sync pattern data disagrees with the reference data, the agreement detector 79B outputs an L-level signal to the counter 79C as shown in FIG. 21 and resets the counter 79C. Otherwise, the agreement detector 79B outputs an H-level signal to the counter 79C and does not reset the counter 79C. The counter 79C is triggered by the output pulse from the trigger detector 79A, counting clock pulses during the interval T1 and outputting a pulse as shown in FIG. 21. The counter 79D is triggered by the output pulse from the counter 79C, counting clock pulses during the interval T2 and outputting a pulse as shown in FIG. 21. The counter 79D is reset by the output pulse from the counter 79D. The output signals from the counters 79C and 79D are combined by the gate element 79E into a signal, that is, the output signal from the gate element 79E, which contains a sequence of pulses as shown in FIG. 21. The output signal from the gate element 75E is fed to the vertical and horizontal sync oscillators 82 and 83. In the case where the trigger detector 79A does not detect the trigger signal or in the case where the sync pattern data disagrees with the reference data, the counter 79C remains inactive and the gate element 79E does not output pulses. The agreement detector 79B outputs another signal to the NSDI circuit 81. Specifically, when the sync pattern data agrees with the reference data, the agreement detector 79B outputs a pulse to the NSDI circuit 81. Otherwise, the agreement detector 79B outputs an H-level signal to the NSDI circuit 81.

Figure 22:
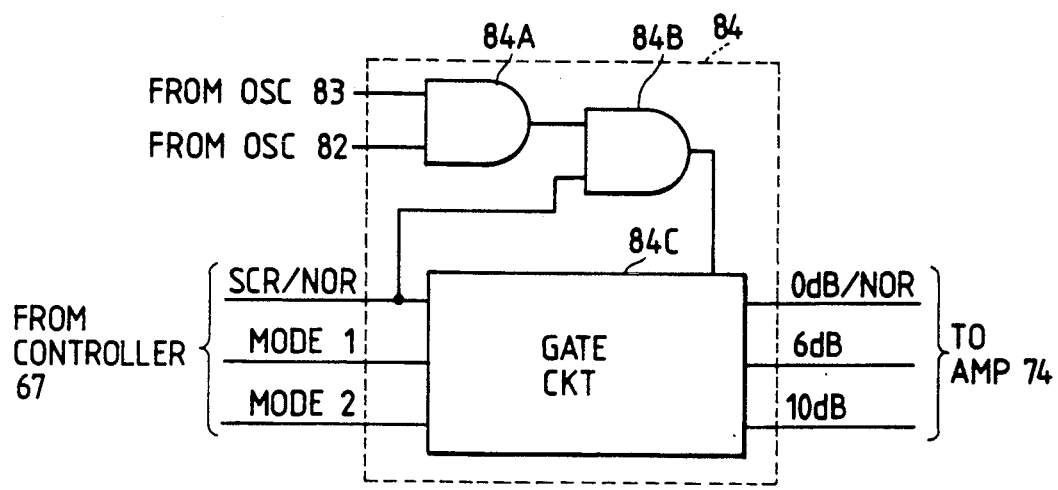
FIG. 22 is a block diagram of the control pulse generator of FIG. 10.
Figure 23:
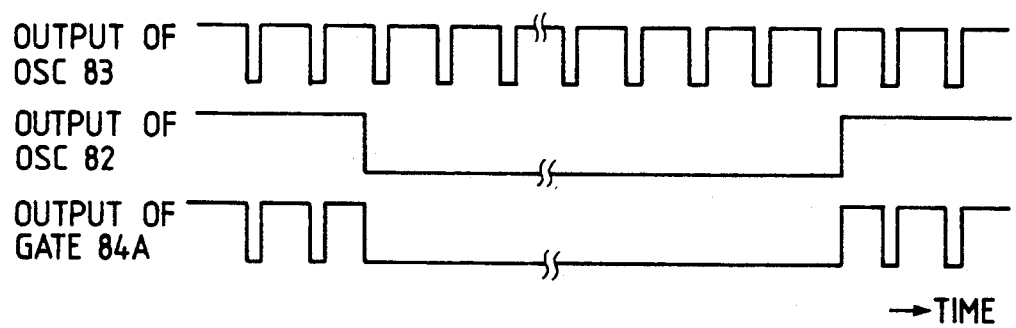
FIG. 23 is a timing diagram showing the waveforms of signals in the control pulse generator of FIG. 22.

As shown in FIG. 22, the control pulse generator 84 includes AND gates 84A and 84B, and a gate circuit 84C. Input terminals of the AND gate 84A receive the output signals from the vertical and horizontal sync oscillators 82 and 83 which have waveforms such as shown in FIG. 23. The AND gate 84A outputs a signal which depends on the output signals from the vertical and horizontal sync oscillators 82 and 83 as shown in FIG. 23. The output signal from the AND gate 84A is fed to a first input terminal of the AND gate 84B. The output signal from the controller 67 is fed to the gate circuit 84C. The output signal from the controller 67 has a scramble/normal bit, a first mode bit, and a second mode bit. The scramble/normal bit of the output signal from the controller 67 is also fed to a second input terminal of the AND gate 84B. The output terminal of the AND gate 84B is connected to the gate circuit 84C. When the scramble/normal bit of the output signal from the controller 67 is "1" and represents the scrambling mode, the AND gate 84B is opened so that the output signal from the AND gate 84A is fed to the gate circuit 84C via the AND gate 84B. Otherwise, the AND gate 84B is closed so that the AND gate 84B continuously outputs "0" to the gate circuit 84C. When the sync suppression level is equal to 0 dB, both the first mode bit and the second mode bit of the output signal from the controller 67 are "0". When the sync suppression level is equal to 6 dB, the first mode bit and the second mode bit of the output signal from the controller 67 are "1" and "0" respectively. When the sync suppression level is equal to 10 dB, both the first mode bit and the second mode bit of the output signal from the controller 67 are "1". The gate circuit 84C generates first, second, and third signals in response to the output signals from the controller 67 and the AND gate 84B. The first signal corresponds to the normal mode or a sync suppression level of 0 dB. The second signal corresponds to a sync suppression level of 6 dB. The third signal corresponds to a sync suppression level of 10 dB. For example, when the output signal from the controller 67 represents the normal mode or when the output signal from the controller 67 represents the scrambling mode with a sync suppression level of 0 dB, the first signal is "0" and the second and third signals are "1". When the output signal from the controller 67 represents the scrambling mode with a sync suppression level of 6 dB, the first and third signals are "1" and the second signal is equal to the output signal from the AND gate 84A. When the output signal from the controller 67 represents the scrambling mode with a sync suppression level of 10 dB, the first and second signals are "1" and the third signal is equal to the output signal from the AND gate 84A. The first, second, and third signals are fed from the gate circuit 84C to the gain control amplifier 74.

This embodiment may be modified in various ways. For example, in a first modification, the sync suppression level is changeable among 4 dB, 6 dB, and 8 dB. In a second modification, pseudo sync signals are generated by using edges of the sync width pulse signal derived from the sync width information signal.

DESCRIPTION OF THE SECOND PREFERRED EMBODIMENT

A second embodiment of this invention is similar to the embodiment of FIGS. 8-14 except for design changes indicated hereinafter. In the second embodiment, the frequency of the carrier outputted from a carrier generator 63 of a transmitting station is changeable between 2.5 MHz and 2.8 MHz. In the second embodiment, a band pass filter 72 of a receiving station includes a pair of filters tuned to 2.5 MHz and 2.8 MHz respectively.

The transmitting station informs receiving stations of the currently-used frequency of the carrier by use of an FSK modulated data signal. In the receiving station, one of the 2.5-MHz and 2.8-MHz filters is selected in accordance with the currently-used frequency of the carrier which is informed by the transmitting station.

The second embodiment can improve the degree of the secrecy of a scrambled television signal relative to the embodiment of FIGS. 8-14.

DESCRIPTION OF THE THIRD PREFERRED EMBODIMENT

Figure 15:
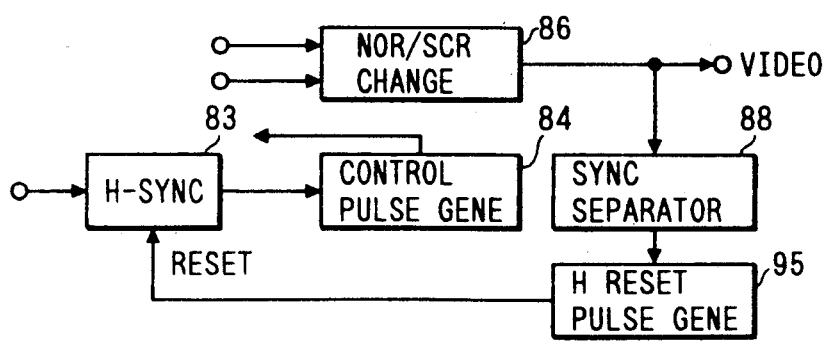
FIG. 15 is a block diagram of a portion of a receiving station in a cable television system according to a third embodiment of this invention.

FIG. 15 shows a portion of a third embodiment of this invention which is similar to the embodiment of FIGS. 8-14 except for design changes indicated hereinafter.

As shown in FIG. 15, the third embodiment includes a horizontal reset pulse generator 95 which replaces the combination of the HD generator 89, the phase comparator 90, the low pass filter 91, and the voltage-controlled oscillator 92 of FIG. 10. The horizontal reset pulse generator 95 generates a reset pulse signal in response to the horizontal sync signal fed from the sync separator 88. The reset pulse signal is fed from the horizontal reset pulse generator 95 to a horizontal sync oscillator 83. The horizontal sync oscillator 83 is reset by the reset pulse signal, establishing the phase lock between the pseudo horizontal sync signal and the actual horizontal sync signal.

What is claimed is:

1. A cable television system comprising a transmitter for transmitting scrambled video information, and at least one receiver receiving the scrambled video information from the transmitter, wherein the transmitter comprises:
   means for suppressing vertical and horizontal sync information in amplitude to execute selectively scrambling; and
   means for superimposing a sync width information signal and key data on a television signal during a predetermined video period within a vertical blanking period, the sync width information signal being modulated at a video band frequency and having a burst form and a predetermined width, the sync width information signal representing whether sync information is present or absent, the key data having a plurality of bits and representing contents of said scrambling;
   wherein the receiver comprises:
   pulse reproducing means for recovering the sync width information signal and outputting a sync width information pulse corresponding to the sync width information signal;

means for generating a reference signal on the basis of an edge of the sync width information pulse outputted from the pulse reproducing means;

means for extracting the key data from the scrambled video information in response to the reference signal;

means for generating pseudo vertical and horizontal sync signals in response to an edge of the sync width information pulse outputted from the pulse reproducing means; and means for increasing the vertical and horizontal sync information of the scrambled video information in amplitude in response to the extracted key data at timings determined by the pseudo vertical and horizontal sync signals.

2. A cable television system comprising a transmitter for transmitting scrambled video information, and at least one receiver receiving the scrambled video information from the transmitter, wherein the transmitter comprises:

means for suppressing vertical and horizontal sync information in amplitude to execute selectively scrambling;

means for superimposing a sync width information signal, a sync pattern signal, and key data on a television signal during a predetermined video period within a vertical blanking period, the sync width information signal being modulated at a video band frequency and having a burst form and a predetermined width, the sync width information signal representing whether sync information is present or absent, the sync pattern signal following the sync width information signal by a predetermined time and having a plurality of bits including a marker signal, the key data having a plurality of bits and representing contents of said scrambling;

wherein the receiver comprises:

pulse reproducing means for recovering the sync width information signal and outputting a sync width information pulse corresponding to the sync width information signal;

means for generating a reference signal on the basis of an edge of the sync width information pulse outputted from the pulse reproducing means;

means for extracting the sync pattern signal and the key data from the scrambled video information in response to the reference signal;

means for generating pseudo vertical and horizontal sync signals in response to the marker signal included in the sync pattern signal;

deciding means for deciding whether or not the extracted sync pattern signal agrees with a predetermined pattern signal, and outputting an agreement detection signal when the extracted sync pattern signal agrees with the predetermined pattern signal; and means for increasing the vertical and horizontal sync information of the scrambled video information in amplitude in response to the extracted key data and the agreement detection signal at timings determined by the pseudo vertical and horizontal sync signals.

3. A cable television system comprising a transmitter for transmitting scrambled video information, and at least one receiver receiving the scrambled video information from the transmitter, wherein the transmitter comprises:

means for suppressing vertical and horizontal sync information in amplitude to execute selectively scrambling which is changeable among a plurality of different modes;

means for superimposing a sync width information signal, a sync pattern signal, and key data on a television signal during a vertical blanking period, the sync pattern signal having a plurality of bits including a marker signal; and means for transmitting control data to the receiver, the control data being designed so as to determine a mode of the scrambling when being combined with the key data;

wherein the receiver receives the control data from the transmitter and comprises:

pulse reproducing means for recovering the sync width information signal and outputting a sync width information pulse corresponding to the sync width information signal;

means for generating a reference signal on the basis of an edge of the sync width information pulse outputted from the pulse reproducing means;

means for extracting the key data from the scrambled video information in response to the reference signal;

calculating means for combining the extracted key data and the received control data, and deciding a mode of the scrambling in response to a result of combining the extracted key data and the received control data; and means for increasing the vertical and horizontal sync information of the scrambled video information in amplitude in response to the scrambling mode decided by the calculating means.

4. A transmitter of a cable television system, comprising:

means for suppressing vertical and horizontal sync information in amplitude in a predetermined pattern to execute selectively scrambling; and means for superimposing a sync width information signal, a sync pattern signal, and key data on a television signal during a predetermined video period within a vertical blanking period, the sync width information signal being modulated at a video band frequency and having a burst form and a predetermined width, the sync width information signal representing whether sync information is present or absent, the sync pattern signal following the sync width information signal by a predetermined time and having a plurality of bits including a marker signal, the key data following the sync pattern signal by a predetermined time and having a plurality of bits, the key data representing contents of said scrambling.

5. The transmitter of claim 4 further comprising means for transmitting control data independently of a transmission of scrambled video information, the control data being designed so as to determine a mode of the scrambling when being combined with the key data, the determined scrambling mode being selected from a plurality of different modes.

6. A receiver of a cable television system, comprising:

pulse reproducing means for recovering a sync width information signal which is superimposed on a scrambled television signal during a vertical blanking period, and for outputting a sync width information pulse corresponding to the sync width information signal;

means for generating a reference signal on the basis of an edge of the sync width information pulse outputted from the pulse reproducing means;

means for extracting key data from the scrambled television signal in response to the reference signal, the key data being superimposed on the scrambled television signal during the vertical blanking period and following the sync width information signal;

means for generating pseudo vertical and horizontal sync signals in response to an edge of the sync width information pulse outputted from the pulse reproducing means; and means for increasing vertical and horizontal sync information of the scrambled television signal in amplitude to de-scramble the scrambled television signal in response to the extracted key data at timings determined by the pseudo vertical and horizontal sync signals.

7. The receiver of claim 6 wherein the pulse reproducing means comprises filtering means for selecting the sync width information signal from the scrambled television signal, and means for subjecting an output signal from the filtering means to a detection process to derive the sync width information pulse.

8. The receiver of claim 7 further comprising means for generating a second reference signal in response to an edge of the sync width information pulse outputted from the pulse reproducing means, means for extracting a marker signal from the scrambled television signal in response to the second reference signal, the marker signal being superimposed on the scrambled television signal during the vertical blanking period and following the sync width information signal by a predetermined time, the marker signal being designed for a detection of a horizontal sync signal, a first counter using the extracted signal as a trigger and counting clock pulses during a first predetermined time to generate a first pseudo horizontal sync signal, and a second counter using the first pseudo horizontal sync signal as a trigger and generating a second pseudo horizontal sync signal at each second predetermined time, the second pseudo horizontal sync signal following the first pseudo horizontal sync signal.

9. The receiver of claim 6 further comprising means for generating a second reference signal in response to an edge of the sync width information pulse outputted from the pulse reproducing means, means for extracting a marker signal from the scrambled television signal in response to the second reference signal, the marker signal being superimposed on the scrambled television signal during the vertical blanking period and following the sync width information signal by a predetermined time, the marker signal being designed for a detection of a horizontal sync signal, a first counter using the extracted signal as a trigger and counting clock pulses during a first predetermined time to generate a first pseudo horizontal sync signal, and a second counter using the first pseudo horizontal sync signal as a trigger and generating a second pseudo horizontal sync signal at each second predetermined time, the second pseudo horizontal sync signal following the first pseudo horizontal sync signal.

10. The receiver of claim 6 further comprising means for generating a second reference signal in response to an edge of the sync width information pulse outputted from the pulse reproducing means, and means for extracting a marker signal from the scrambled television signal in response to the second reference signal, the marker signal being superimposed on the scrambled television signal during the vertical blanking period and following the sync width information signal by a predetermined time, the marker signal being designed for a detection of a horizontal sync signal.

11. The receiver of claim 6 further comprising means for generating a reference pulse of a predetermined width in response to an edge of the sync width information pulse outputted from the pulse reproducing means, means for extracting a suppressed horizontal sync signal from the scrambled television signal in response to the reference pulse, and means for setting a moment of a generation of the reference pulse by the reference-pulse generating means to a moment which follows a moment of an occurrence of the edge of the sync width information pulse by a predetermined time.

12. The receiver of claim 6 further comprising means for generating a second refernce signal in response to an edge of the sync width information pulse outputted from the pulse reproducing means, means for extracting a marker signal from the scrambled television signal in response to the second reference signal, the marker signal being superimposed on the scrambled television signal during the vertical blanking period and following the sync width information signal by a predetermined time, the marker signal being designed for a detection of a horizontal sync signal, means for using the extracted marker signal as a trigger and generating pseudo horizontal and vertical sync signals, means for detecting a timing of scrambling of horizontal and vertical sync information of the scrambled television signal in response to the pseudo horizontal and vertical sync signals, and means for increasing the vertical and horizontal sync information of the scrambled television signal in amplitude to de-scramble the scrambled television signal at timings determined by the detected timing of the scrambling.

13. The receiver of claim 12 further comprising means for separating actual sync signals from the de-scrambled television signal, means for detecting a difference in phase between the actual sync signals and the pseudo sync signals, and means for controlling the pseudo sync signal generating means in response to the detected phase difference so as to nullify the detected phase difference.

14. An apparatus for a cable television receiver, comprising:

means for generating pseudo sync information;

means for increasing sync information in scrambled video information in amplitude in response to the pseudo sync information to de-scramble the scrambled video information into a de-scrambled video information;

means for separating actual sync information from the de-scrambled video information; and means for controlling the pseudo sync information in response to the separated actual sync information to nullify a phase difference between the pseudo sync information and the actual sync information.

15. A cable television system comprising a transmitter for transmitting scrambled video information, and at least one receiver receiving the scrambled video information from the transmitter, wherein the transmitter comprises:

means for suppressing vertical and horizontal sync information in amplitude to execute selectively scrambling to convert a television signal into a scrambled television signal;

means for superimposing a sync width information signal, a sync pattern signal, and key data on the scrambled television signal during a predetermined period within a vertical blanking period, the sync width information signal being modulated at a video band frequency and having a burst form, the sync width information signal representing whether sync information is present or absent, the sync pattern signal having a plurality of bits and representing a timing of the sync information, the key data having a plurality of bits and representing contents of said scrambling; and means for transmitting control data to the receiver independently of a transmission of the scrambled video information, the control data being designed so as to determine a mode of the scrambling when being combined with the key data;

wherein the receiver comprises means for de-scramble the scrambled video information in accordance with the mode determined by a combination of the key data and the control data only when the sync pattern signal agrees with a predetermined pattern signal and the key data and the control data are detected.

* * * * *